(12) United States Patent
Hahn et al.

(10) Patent No.: US 9,912,792 B2
(45) Date of Patent: Mar. 6, 2018

(54) MOBILE TERMINAL

(71) Applicant: LG ELECTRONICS INC., Seoul (KR)

(72) Inventors: Sangwook Hahn, Seoul (KR); Sooyong Song, Seoul (KR); Sangchul Jeon, Seoul (KR); Youngjin Hyun, Seoul (KR); Hyoyeol Lee, Seoul (KR); Euna Kim, Seoul (KR); Woohun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 14/906,515

(22) PCT Filed: Feb. 21, 2014

(86) PCT No.: PCT/KR2014/001428
§ 371 (c)(1),
(2) Date: Jan. 20, 2016

(87) PCT Pub. No.: WO2015/012463
PCT Pub. Date: Jan. 29, 2015

(65) Prior Publication Data
US 2016/0165027 A1 Jun. 9, 2016

(30) Foreign Application Priority Data

Jul. 22, 2013 (KR) .................. 10-2013-0086299
Jul. 22, 2013 (KR) .................. 10-2013-0086300

(51) Int. Cl.
H04M 1/00 (2006.01)
H04M 1/23 (2006.01)
(Continued)

(52) U.S. Cl.
CPC .......... H04M 1/236 (2013.01); G06F 1/1626 (2013.01); G06F 3/041 (2013.01); H04B 1/38 (2013.01);
(Continued)

(58) Field of Classification Search
CPC ................ H04M 1/236; H04M 1/22
See application file for complete search history.

(56) References Cited

U.S. PATENT DOCUMENTS 9,063,583 B2* 6/2015 Kim ................ H04M 1/236
9,064,643 B2* 6/2015 Park ................ H04M 1/22
(Continued)

FOREIGN PATENT DOCUMENTS

| CN | 101064891 | 10/2007 |
|----|-----------|---------|
| CN | 101256908 | 9/2008 |

(Continued)

OTHER PUBLICATIONS

European Patent Office Application Serial No. 14829385.5, Search Report dated Feb. 21, 2017, 7 pages.
(Continued)

*Primary Examiner* — Barry Taylor
(74) *Attorney, Agent, or Firm* — Lee, Hong, Degerman, Kang & Waimey

(57) ABSTRACT

The present invention provides a mobile terminal comprising: a terminal body having a display part on the front side thereof; and a back input part exposed to the back side of the body and having a first button part for receiving a push input of a first function, wherein the first button part comprises: an exposed part having a colored layer and exposed to the outside; a knob part formed on the back side thereof so as to fix the exposed part; and a body part covering the knob part and formed to be integrated with the exposed part.

15 Claims, 26 Drawing Sheets

(51) Int. Cl.
*H04B 1/38* (2015.01)
*H04B 1/3888* (2015.01)
*H04B 1/3827* (2015.01)
*H04M 1/02* (2006.01)
*G06F 1/16* (2006.01)
*G06F 3/041* (2006.01)
*H04M 1/22* (2006.01)

(52) U.S. Cl.
CPC ......... *H04B 1/3833* (2013.01); *H04B 1/3888* (2013.01); *H04M 1/0266* (2013.01); *H04M 1/233* (2013.01); *H04M 1/22* (2013.01)

(56) References Cited

U.S. PATENT DOCUMENTS

| | | | |
|---|---|---|---|
| 9,380,453 B2* | 6/2016 | Park | H04M 1/72519 |
| 2002/0050919 A1 | 5/2002 | Vance | |
| 2002/0118175 A1* | 8/2002 | Liebenow | G06F 1/1626 345/168 |
| 2007/0246341 A1 | 10/2007 | Kim et al. | |
| 2007/0268261 A1* | 11/2007 | Lipson | G06F 1/1616 345/169 |
| 2008/0151526 A1 | 6/2008 | Miyashita et al. | |
| 2010/0193341 A1 | 8/2010 | Uotani | |
| 2011/0149573 A1 | 6/2011 | Lee et al. | |

FOREIGN PATENT DOCUMENTS

| | | |
|---|---|---|
| CN | 101266317 | 9/2008 |
| CN | 101460913 | 6/2009 |
| CN | 102289311 | 12/2011 |
| KR | 10-2008-0049237 | 6/2008 |
| KR | 10-2010-0085498 | 7/2010 |
| KR | 10-2011-0113243 | 10/2011 |
| KR | 10-2011-0136433 | 12/2011 |
| KR | 10-2013-0016704 | 2/2013 |

OTHER PUBLICATIONS

The State Intellectual Property Office of the People's Republic of China Application Serial No. 201480041383.5, Office Action dated Dec. 21, 2016, 9 pages.

The State Intellectual Property Office of the People's Republic of China Application Serial No. 201480041383.5, Office Action dated Aug. 17, 2017, 11 pages.

PCT International Application No. PPCT/KR2014/001428, Written Opinion of the International Searching Authority dated Jun. 9, 2014, 1 page.

* cited by examiner

MOBILE TERMINAL

CROSS-REFERENCE TO RELATED APPLICATIONS

This application is the National Stage filing under 35 U.S.C. 371 of International Application No. PCT/KR2014/001428, filed on Feb. 21, 2014, which claims the benefit of earlier filing date and right of priority to Korean Application Nos. 10-2013-0086299, filed on Jul. 22, 2013, and 10-2013-0086300, filed on Jul. 22, 2013, the contents of which are all hereby incorporated by reference herein in their entirety.

TECHNICAL FIELD

The present invention relates to a mobile terminal in which a user input unit for receiving a control command is provided and a width of a side bezel is reduced.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player.

Various attempts have been made to implement complicated functions in such a multimedia device by means of hardware or software. For example, a user interface environment allowing users to easily and conveniently search for and select functions is provided.

Also, as mobile terminals are considered as personal belongings for expressing users' personality, various design forms are requested. The design forms include structural alteration and improvement allowing user to more conveniently use a mobile terminal. As one of structural alterations and improvements, a manipulation unit may be considered.

However, a manipulation unit provided separately from a touch screen hampers slim terminals and a simple design. Also, a problem in which a display area is reduced due to the presence of the manipulation unit on a side surface of a terminal arises. Thus, as a solution, an input method based on a new scheme may be taken into consideration.

Also, as mobile terminals are considered as personal belongings for expressing users' personality, various designs are requested, and recently, designs tend to be simplified by minimizing protrusions on surfaces of mobile terminals. Thus, touch screens are increasingly applied to mobile terminals, as input units for inputting information to mobile terminals.

As mobile terminals are increased in size, the number of touch window channels is also increased, and thus, as a width of a touch pattern is increased, a width of a bezel is also increased.

DISCLOSURE

Technical Problem

Therefore, an object of the present invention is to provide a mobile terminal allowing for a user input in a new form different from a conventional scheme.

Another object of the present invention is to provide illumination to a back input part to thus enhance user convenience.

Another object of the present invention is to reduce a width of a bezel in which a touch pattern is formed by separately forming touch patterns on both sides in a touch screen-applied mobile terminal.

Technical Solution

According to an aspect of the present invention, there is provided a mobile terminal including: a terminal body in which a display part is formed on a front side thereof; and a back input part including a first button part exposed to a back side of the terminal body to receive a push input of a first function, wherein the first button part includes: an exposed portion having a colored layer formed thereon and exposed to the outside; a knob portion formed on a back side to fix the exposed portion; and a body portion covering the knob portion and integrally formed with the exposed portion.

According to an embodiment of the present disclosure, the mobile terminal may further include: a second button part disposed to be adjacent to the first button part and exposed to the back side of the terminal body to receive a push input of a second function.

According to an embodiment of the present disclosure, the mobile terminal may further include: a first printed circuit board (PCB) disposed within the terminal body and allowing various electronic components to be mounted thereon; a shield can covering the first PCB to shield the electronic components; and a second PCB electrically connected to the first PCB and configured to have the back input part.

According to an embodiment of the present disclosure, the second button part may have a through hole accommodating the first button part.

According to an embodiment of the present disclosure, the exposed portion may be formed of stainless steel, and the body unit may be formed of a light-transmissive material.

According to an embodiment of the present disclosure, the back input part may include: a support member disposed on back sides of the first and second button parts, and having protrusions formed on a back side thereof to correspond to the first and second button parts; a plate disposed below the support member, having switches formed in a row and operated upon being pressed by the protrusions, and formed on the second PCB; a light source disposed on one side of the switches or on both sides of the switches; a light guide formed to cover at least a portion of the switches and connected to the light source to emit light from the light source; and a light blocking member disposed no both ends of an upper surface of the light guide and causing light to be introduced only to the light guide.

According to an embodiment of the present disclosure, the light guide may have a through hole formed in a portion corresponding to the protrusion, may be disposed in a direction intersecting with the row, and may cover a portion or the entirety of the switches. The switches may be connected by an air path.

According to an embodiment of the present disclosure, the support member may include a demarcating portion configured to demarcate a region corresponding to the first button part and a region corresponding to the second button part, may be formed of rubber, and may be coupled to the first and second button part by a hook formed at an edge thereof or may be coupled to the first and second button parts by bonding. A wing may be formed on an edge of the second button part so as to be caught by a back side of the terminal body.

According to an embodiment of the present disclosure, the plate, the light source, the light guide, the light blocking member, and the second PCB may be integrally formed by the hook of the support member.

According to an embodiment of the present disclosure, the first PCB and the second PCB may be connected by a connector, and a key plate assisting rigidity of the shield can may be disposed between the shield can and the second PCB.

According to an embodiment of the present disclosure, the second button part may include a planar portion parallel to the back side of the terminal body and a sloped portion sloped downwardly toward the through hole from the planar portion, and the first button part may be formed to be inwardly recessed, compared with the back side of the terminal body.

According to an embodiment of the present disclosure, the first function may be a function related to ON/OFF of power or activation of the display part, and the second function may be a function related to scroll with respect to output information of the display part or a function related to adjustment of a volume of a sound output from the terminal body.

According to an aspect of the present invention, there is provided a mobile terminal including: a terminal body in which a display part is formed on a front side thereof; and a back input part including a first button part exposed to a back side of the terminal body to receive a push input of a first function, wherein the back input part includes a support member allowing the first and second button parts to penetrate through an interior thereof so as to be exposed to the outside; a flexible printed circuit board (FPCB) attached to a back side of the support member; a light source installed in a region corresponding to the first and second button parts on the FPCB, and a switch pressed when the first and second button parts are pressed, and disposed below the FPCB, wherein the support member, the FPCB, the light source, and the switch are integrally formed.

According to an embodiment of the present disclosure, the mobile terminal may further include a support member positioned below the switch and supporting the switch when the switch is pressed.

According to an embodiment of the present disclosure, the first button part may have an exposed portion formed on an upper surface thereof and exposed to the outside, protruding along an outer edge thereof so as to be exposed, and limited in movement to the outside by the second button part.

According to an aspect of the present invention, there is provided a mobile terminal including: a touch sensing part disposed below a window and having touch patterns divided into a plurality of touch areas to sense a touch; a first signal transmission part passing through an edge area of the touch sensing part, connected with a portion of the touch patterns of the touch areas and joined at one side of the touch sensing part; a second signal transmission part passing through the edge area of the touch sensing part, connected with a remaining portion of the touch patterns of the touch areas, and joined at the other side of the touch sensing part; a first printed circuit board (FPCB) and a second FPCB to which the first and second signal transmission parts are respectively connected; and a first connector and a second connector respectively connecting the first and second FPCBs to and PCB.

According to an embodiment of the present disclosure, the touch patterns may include first patterns configured to traverse the touch sensing part and extend in a first direction and second patterns configured to extend in a second direction intersecting with the first direction, the first patterns and the second patterns may be disposed on the same plane, and any one of the first patterns and the second patterns may be connected to each other by bridges.

According to an embodiment of the present disclosure, a signal transmission part may alternately be connected to one side or the other side of the touch patterns, and the first and second connectors may be connected through a third FPCB connected to the PCB.

According to an embodiment of the present disclosure, the plurality of touch areas may be divided into two or more regions in a length direction of the touch sensing part, or may be divided into two or more regions in a width direction of the touch sensing part.

According to an embodiment of the present disclosure, the touch sensing part may be stacked on the display part and include a wiring part bent from a side end of the display part to cover at least one side surface of the display part, and the first and second signal transmission parts may be formed in the wiring part.

According to an embodiment of the present disclosure, the wiring part may extend to cover a back side of the display part. The touch sensing part may further include an insulating layer insulating the first patterns and the second patterns at portions in which the first patterns and the second patterns intersect with each other.

According to an embodiment of the present disclosure, an adhesive layer may be formed between the window and the display part. The mobile terminal may further include a shield can configured to shield the first PCB.

According to an embodiment of the present disclosure, the first and second connectors may be connected by a connection line, and the connection line may be coupled to the PCB.

Advantageous Effects

According to embodiments of the present invention, since a back input part is disposed on a back side of a terminal, a front display may be formed as a large screen.

Also, a user may discriminate among buttons using a sense of touch through a shape of a back input part disposed on a back side of a terminal even without viewing it.

Also, since a width of left and right touch patterns is reduced, a narrow bezel may be implemented, and even when one FPCB does not operate, the mobile terminal may be driven by the other FPCB. That is, one FPCB does not operate, a user interface (UI) may be configured according to an operable partial screen.

BEST MODES

Hereinafter, a mobile terminal related to embodiments of the present disclosure will be described with reference to the accompanying drawings. In the following description, usage of suffixes such as 'module', 'part' or 'unit' used for refer- ring to elements is given merely to facilitate explanation of the present invention, without having any significant mean- ing by itself.

Mobile terminals described in the present disclosure may include mobile phones, smart phones, notebook computers, digital broadcast terminals, PDAs (Personal Digital Assis- tants), PMPs (Portable Multimedia Player), navigation devices, and the like.

Figure 1:
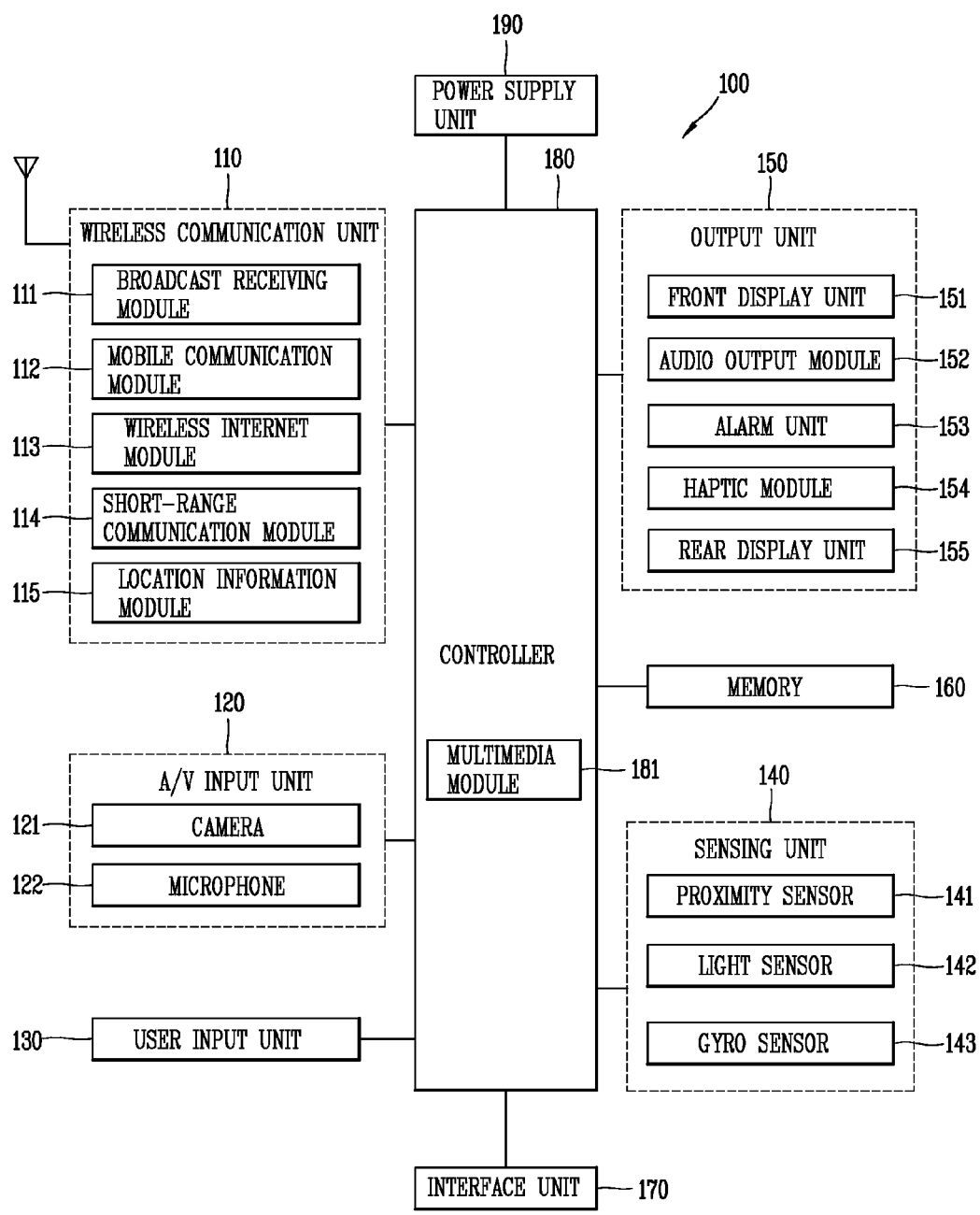
FIG. 1 is a block diagram of a mobile terminal related to an embodiment of the present disclosure.

FIG. 1 is a block diagram of a mobile terminal 100 according to an embodiment of the present invention.

The mobile terminal 100 includes a wireless communi- cation unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that imple- menting all of the illustrated components is not a require- ment. Greater or fewer components may alternatively be implemented.

Hereinafter, the elements of the mobile terminal will be described in detail as follows.

The wireless communication unit 110 typically includes one or more modules allowing for radio communication between the mobile terminal 100 and a wireless communi- cation system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast chan- nel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broad- cast signal, and the like. Also, the broadcast signal may further include a broadcast signal combined with a TV or radio broadcast signal.

The broadcast associated information may refer to infor- mation associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digi- tal video broadcast-handheld (DVB-H), the data broadcast- ing system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth, Radio Frequency IDentification (RFID), Infrared Data Association (IrDA), Ultra-WideBand (UWB), ZigBee, and the like.

The location information module 115 is a module for checking or acquiring a location (or position) of the mobile terminal. A typical example of the location information module is a GPS (Global Positioning System).

Referring to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a front display part 151 and/or a rear display part 155.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. Meanwhile, the sensing unit 140 can include a proximity sensor 141, a light sensor 142, and a gyro sensor 143.

The output unit 150 is configured to provide outputs in a visual, audible, and/or tactile manner (e.g., audio signal, video signal, alarm signal, vibration signal, etc.). The output unit 150 may include the front display part 151, an audio output module 152, an alarm unit 153, a haptic module 154, and the like.

The front display part 151 may display (output) information processed in the mobile terminal 100. For example, when the mobile terminal 100 is in a phone call mode, the front display part 151 may display a User Interface (UI) or a Graphic User Interface (GUI) associated with a call. When the mobile terminal 100 is in a video call mode or image capturing mode, the front display part 151 may display a captured image and/or received image, a UI or GUI.

The front display part 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the back side of the terminal body through the region occupied by the front display part 151 of the terminal body.

The mobile terminal 100 may include two or more display parts according to its particular desired embodiment. For example, a plurality of display parts may be separately or integrally disposed on one surface of the mobile terminal, or may be separately disposed on mutually different surfaces.

When the front display part 151 and a sensor (referred to as a 'touch sensor', hereinafter) for detecting a touch operation are overlaid in a layered manner to form a touch screen, the front display part 151 may function as both an input device and an output device. The touch sensor may have a form of a touch film, a touch sheet, a touch pad, and the like.

The touch sensor may be configured to convert pressure applied to a particular portion of the front display part 151 or a change in the capacitance or the like generated at a particular portion of the front display part 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the front display part 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, or a buzzer.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. Outputs informing about the occurrence of an event may be also provided via the front display part 151 or the audio output module 152. The front display part 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

A rear display part 155 corresponding to the front display part 151 is provided on a back side of the mobile terminal 100. The rear display part 155 may have a size smaller than that of the front display part 151 and may display relatively simple information.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Referring to the user input unit 130, in an embodiment of the present disclosure, the user input unit 130 is disposed on a back side of the terminal, and thus, the front display may be formed as a relatively large screen. Hereinafter, a detailed structure in which the user input unit 130 is disposed on the back side of the terminal and an operation implemented by the detailed structure will be described.

Figure 2A:
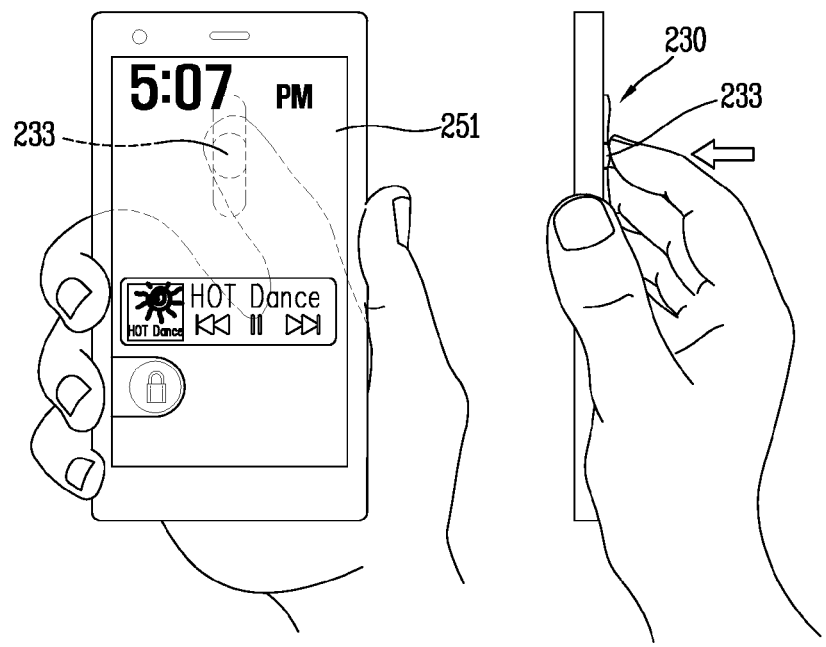
FIGS. 2A and 2B are conceptual views illustrating an operation implemented by an embodiment of the present disclosure.
Figure 2B:
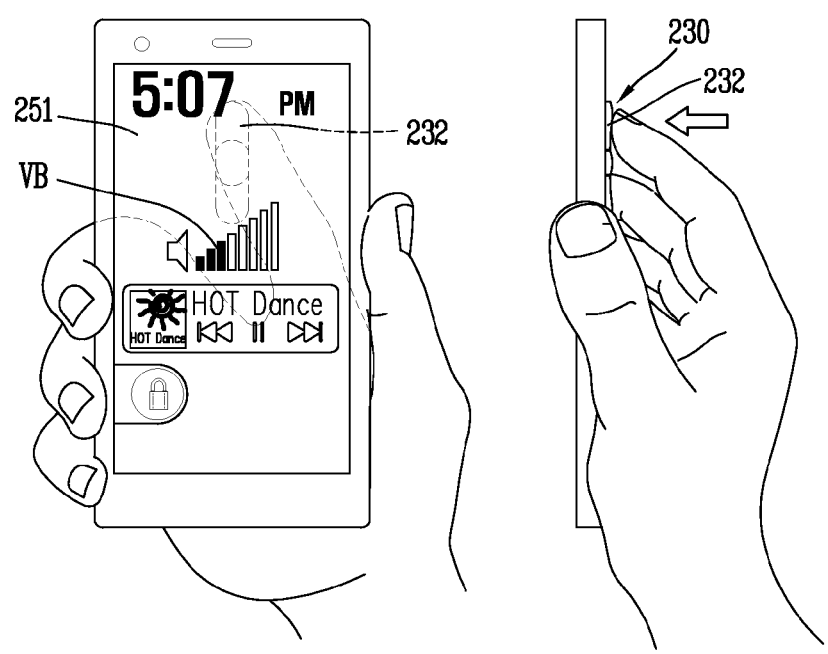

FIGS. 2A and 2B are conceptual views illustrating operations implemented by the present disclosure.

Referring to FIG. 2A, a terminal includes a display part 251 disposed on one surface of a main body of the terminal, for example, on a front side of the terminal. A GUI of a currently executed application may be output on the display part 251, and the display part 251 may include a touch sensor for sensing a touch input such that a touch input may be applied to the GUI. The display part 251 may output visual information implemented in the form of an image such as the GUI, text, an icon, and the like, and may be switched to a deactivated state when a predetermined period of time has lapsed or according to an input of a specific control command. FIG. 2A shows such a state, in which the display part 251 is deactivated, while a music play application is being executed.

A back input part 230 is disposed on the other surface of the main body, for example, on a back side of the mobile terminal. A control command regarding the display part 251 is received in the ear input unit 230. In detail, when a push input is applied to any button 233 of the back input part 230, the display part 251 is switched to an activated state. That is, the back input part 230 may be a power key for turning on and off the display part 251. Thus, ON/OFF of the terminal itself may also be performed by the button 233. As illustrated, as the display part 251 is activated, a GUI of a music play application is output.

Referring to FIG. 2B, when a push input is applied to another button 232 of the back input part 230 in the state illustrated in FIG. 2A, a volume bar VB is output and a volume is adjusted by operating the button 232. However, the present disclosure is not limited to the process, and a push input applied to the button 232 of the back input part 230 may be an input with respect to adjustment of a volume in the state of FIG. 2A.

According to the example, the user may input a control command to the back side of the terminal in a push manner, while viewing the display part 251. As a result, the back input part of the back side of the terminal is configured to receive a push input, and may serve as a power key and a volume key of the terminal according to circumstances.

Figure 3A:
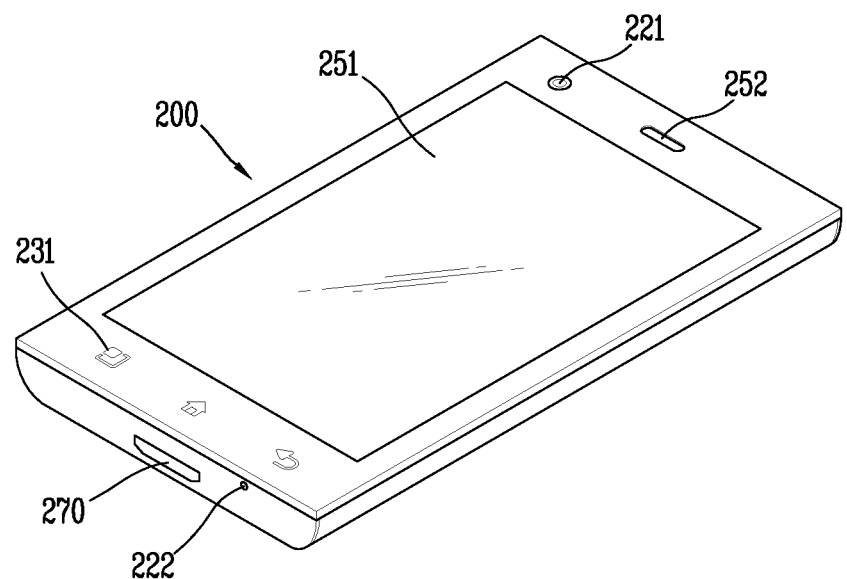
FIG. 3A is a front perspective view illustrating an example of a mobile terminal related to an embodiment of the present disclosure.
Figure 3B:
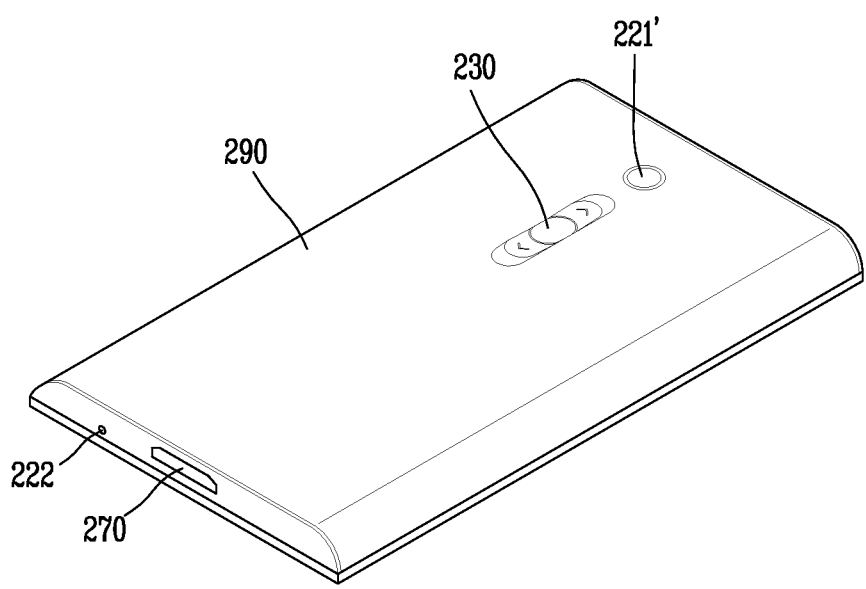
FIG. 3B is a rear perspective view of the mobile terminal illustrated in FIG. 3A.

Hereinafter, a hardware configuration of the terminal performing the operations of FIGS. 2A and 2B will be described in detail. FIG. 3A is a front perspective view illustrating an example of a mobile terminal related to an embodiment of the present disclosure, and FIG. 3B is a rear perspective view of the mobile terminal illustrated in FIG. 3A.

The disclosed mobile terminal 200 has a bar type terminal body. However, the present invention is not limited thereto and may be applicable to various structures such as a slide type mobile terminal, a folder type mobile terminal, a swing type mobile terminal, a swivel type mobile terminal, etc, in which two or more bodies are combined to be relatively movable.

The body includes a case (or casing, housing, cover, etc.) constituting the external appearance. In this embodiment, the case may include a front case 201 and a rear case 202 (please refer to FIG. 4). Various electronic components are installed in the space between the front case 201 and the rear case 202. One or more intermediate cases may be additionally disposed between the front case 201 and the rear case 202.

The cases may be formed by injection-molding a synthetic resin or may be made of a metallic material such as stainless steel (STS) or titanium (Ti), etc.

A display part 251, an audio output module 252, a camera module 221, etc. may be disposed mainly on the front case 201 of the terminal body 200. An interface 270, or the like, may be disposed on sides of the front case 201 and the rear case 202.

The display part 251 occupies the most of a main surface of the front case 201. That is, the display part is disposed on the front side of the terminal and formed to display visual information. The audio output unit 251 and the camera module 221 are disposed at a region adjacent to one end portion among both end portions of the display part 251, and a front input unit 231 and a microphone 222 are disposed at a region adjacent to another end portion.

The front input unit 231 is an example of the user input unit 130 (please refer to FIG. 1) and may include a plurality of manipulation units. The manipulation units may be generally referred to as a manipulating portion, and various methods and techniques may be employed for the manipulation portion as long as they can be operated by the user in a tactile manner. In the present disclosure, the front input unit 231 is configured as a touch key. However, the present disclosure is not limited thereto and a push key may be added to the front input unit 231.

Also, the display part 251 may form a touch screen together with a touch sensor, and in this case, the touch screen may be a user input unit. Through this, a configuration without a front input unit on the front side of the terminal may also be used. In this case, the mobile terminal may be configured such that an input manipulation with respect to the terminal body may be performed only through the display part 251 and the back input part 230 as described hereinafter.

Referring to FIG. 3B, a camera module 221' may additionally be disposed on the rear case 202 of the terminal body. The camera module 221' may have an image capture direction which is substantially opposite to that of the camera module 221 (please refer to FIG. 3A), and have a different number of pixels than the camera module 221.

For example, the camera module 221 may have a smaller number of pixels to capture an image of the user's face and transmit such image to a counterpart, and the camera module 221' may have a larger number of pixels to capture an image of a general object and not immediately transmit it in most cases. The camera modules 221 and 221' may be installed on the terminal body such that they can be rotatable or popped up.

A flash and a mirror may be additionally disposed to be adjacent to the camera module 221'. When an image of a subject is captured with the camera module 221', the flash illuminates the subject. The mirror allows the user to see himself when he wants to capture his own image (i.e., self-image capturing) by using the camera 221'.

An audio output unit (not shown) may be additionally disposed on the back side of the terminal body. The audio output unit of the back side may implement a stereoscopic function along with the audio output module 252 (please refer to FIG. 3A) of the front side, and may be used for implementing a speaker phone mode during call communication.

A power supply unit 290 for supplying power to the mobile terminal 200 may be installed on the terminal body. The power supply unit 290 may be installed in the terminal body or may be directly detached from the outside of the terminal body.

As illustrated, the back input part 230 is disposed on the back side of the terminal body. The back input part 230 may be positioned below the camera module 221', for example.

The back input part 230 may be manipulated to receive a command for controlling an operation of the mobile terminal 200 and input contents may be variously set. For example, the back input part 230 receive a command such as ON/OFF of power, starting, ending, scrolling, etc., a command such as controlling of the volume of a sound output from the audio output unit 252 or conversion into a touch recognition mode of the display part 251.

Figure 4:
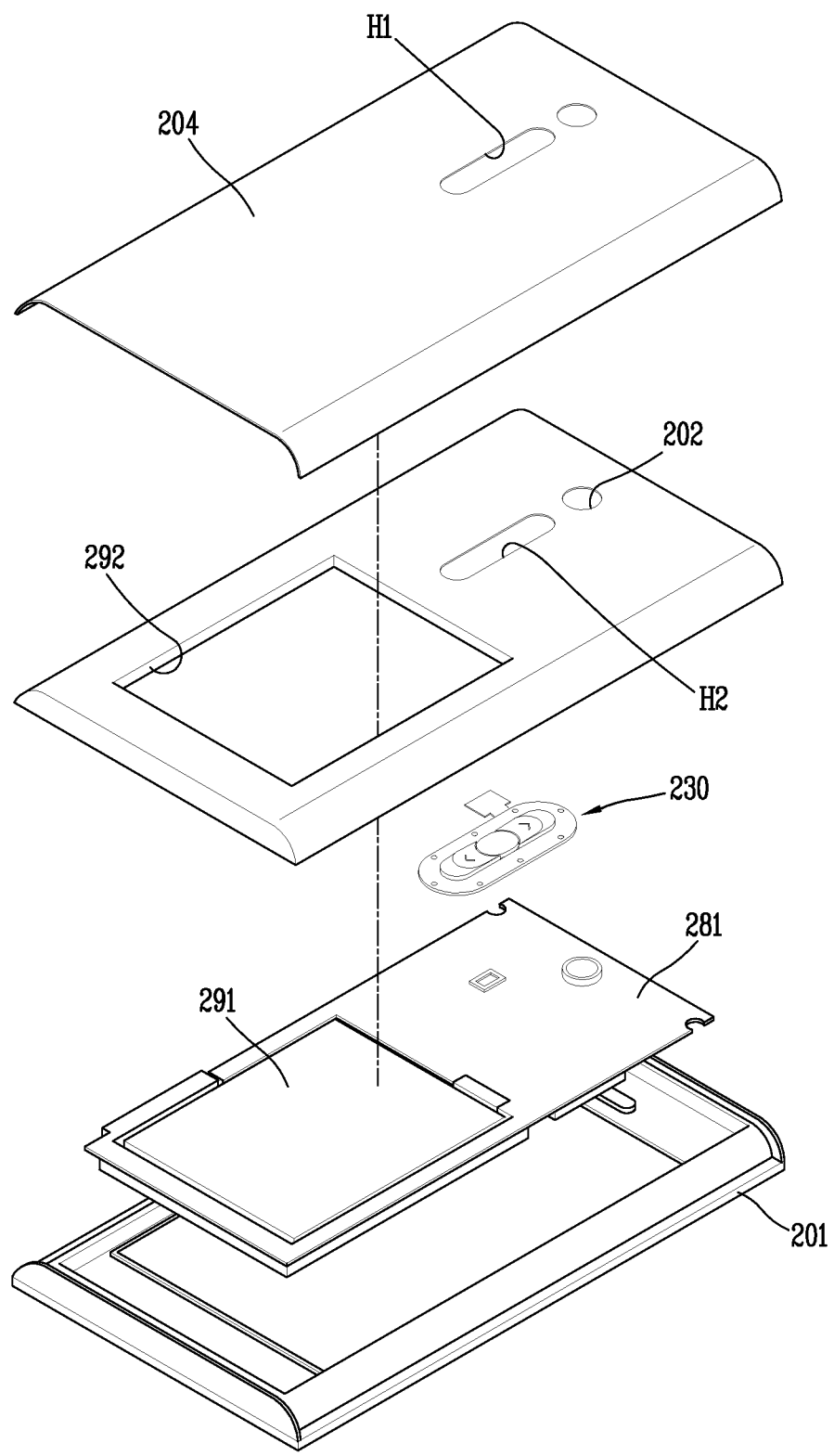
FIG. 4 is an exploded perspective view of the mobile terminal of FIG. 3B.
Figure 5:
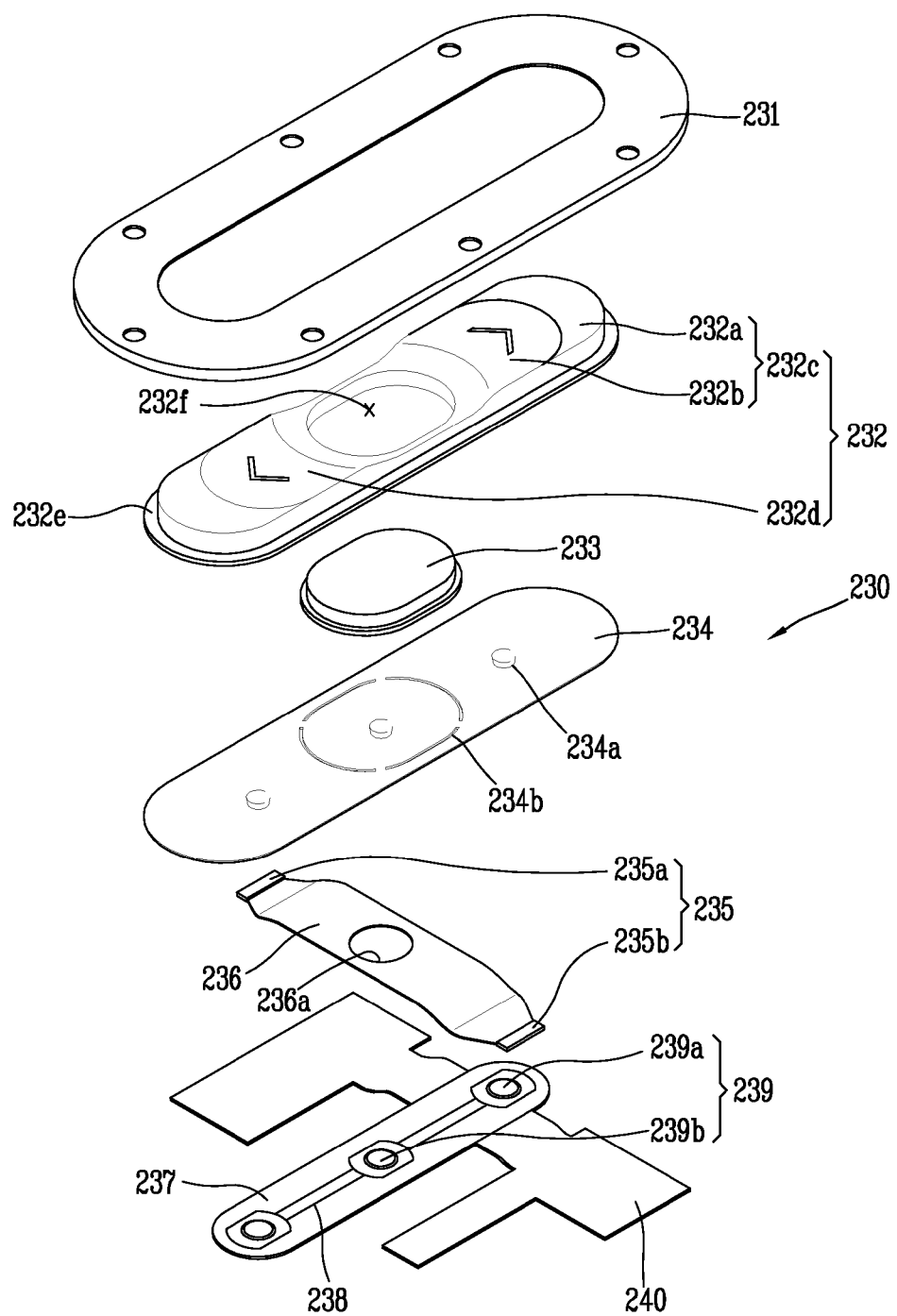
FIG. 5 is a detail exploded view illustrating a back input part related to an embodiment of the present disclosure.
Figure 6:
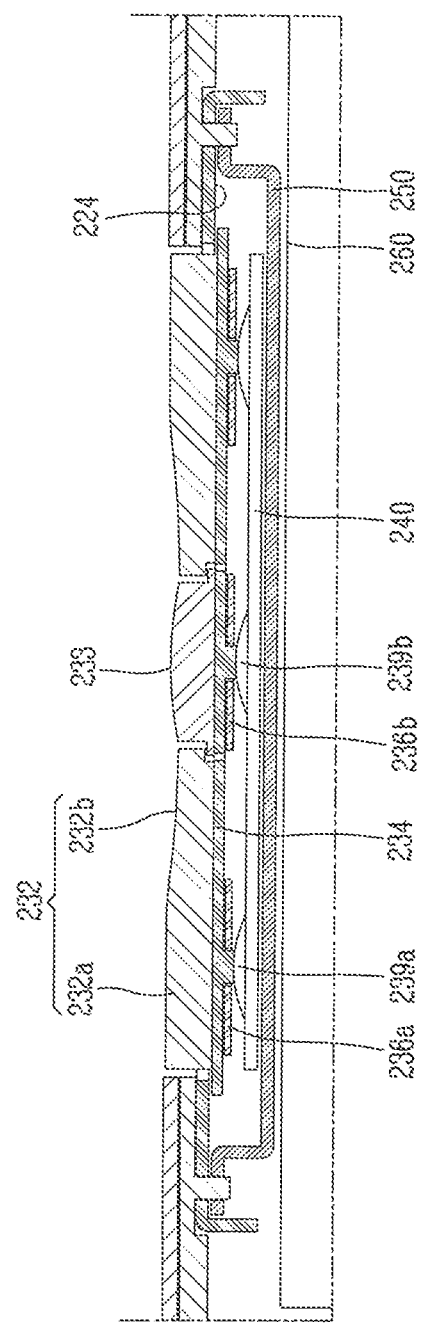
FIG. 6 is a cross-sectional view illustrating a state in which the back input part of FIG. 5 is coupled.
Figure 7A:
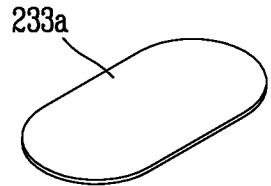
FIG. 7 is a view illustrating a process of manufacturing a first button part related to an embodiment of the present disclosure.
Figure 7B:
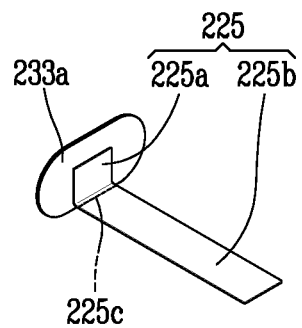
Figure 7C:
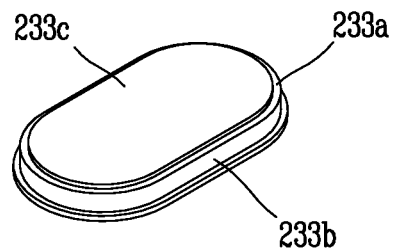
Figure 7D:
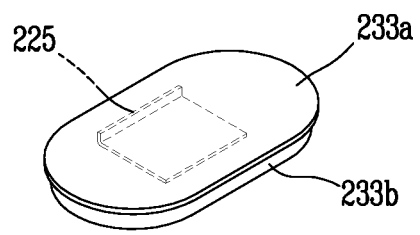

The rear input surface unit 230 of the present disclosure is implemented to be available for a push input. In detail, the back input part 230 may be configured as a mechanical or physical button, having a relative concept with respect to a touch screen. Hereinafter, a configuration of the back input part 230 will be described in more detail. FIG. 4 is an exploded perspective view of the mobile terminal of FIG. 3B, FIG. 5 is a detail exploded view illustrating a back input part related to an embodiment of the present disclosure, and FIG. 6 is a cross-sectional view illustrating a state in which the back input part of FIG. 5 is coupled.

Hereinafter, an embodiment of the present disclosure will be described with reference to FIGS. 4 through 6.

First, the back input part 230 and the surroundings thereof will be described. A printed circuit board (PCB) 281 is installed in the terminal body. For example, the PCB 281 may be installed in the front case 201 or the rear case 202 or may be installed in a separate structure. The separate structure may form an intermediate case. Here, it is described that the front case 201 or the rear case 202 are separately configured, but the present disclosure is not limited thereto and the cases 201 and 202 may be integrally formed.

The PCB 281 is configured as an example of the controller 180 (please refer to FIG. 1) for operating various functions of the mobile terminal. The PCB 281 may be provided in plurality, and the plurality of PCBs may be combined to perform a function of the controller 180. In order to perform such a function, various electronic elements are installed on the PCB 281.

Also, the PCB 281 is electrically connected to an antenna (not shown), and configured to process a wireless signal corresponding to an electromagnetic wave transmitted and received by the antenna. The antenna is disposed between the structure and the PCB 281 to transmit and receive a wireless signal mainly through the rear case 202.

The PCB 281 may be electrically connected to the camera module 221'. A battery accommodation portion 292 for accommodating a battery 291, and a battery cover 204 covering the battery accommodation portion 292 is installed on the case.

Also, a through hole is formed in each of the rear case 202 and the battery cover 204, and the camera module 221' is disposed to view the outside through the through holes. The camera module 221' is configured to capture an external image through the back side of the terminal.

Referring to the back input part 230, in order to prevent formation of a recess on a side surface of the terminal body in the length direction due to the back input part, the back input part 230 overlaps the display part 251 in the thickness direction of the terminal body and is exposed to the back side of the terminal body, rather than to the side surface thereof. Hereinafter, a detailed structure of the back input part 230 and a side surface structure of the terminal will be described.

The back input part 230 may be disposed between the camera module 221' and the battery. The back input part 230 may be positioned to overlap the display part 251 (please refer to FIG. 3A) of the front side of the terminal. Through this, a sense of use that the input device is disposed on the back side of the display part 251 may be implemented. However, the present invention is not limited thereto and the position of the back input part 230 may be modified. As illustrated, the battery cover 204 has a through hole H1 corresponding to the back input part 230. Also, the rear case 202 has a through hole H2 formed to correspond to the through hole H1.

As illustrated in FIG. 5, a support member 231 is installed in the rear case 202 to insert-couple the back input part 230 to the rear case 202 to support the back input part 230. In detail, the support member 231 is disposed in a position corresponding to the through hole H2. At least a portion of the support member 231 is opened, and other components of the back input part 230 may be coupled through the opening of the support member 231 so as to be exposed to the outside. Here, a PCB 240 connected to the PCB 281 is provided below the back input part 230. The PCB 240 is configured as a flexible PCB and caught by the support member 231. Switches 239 may be disposed on the FPCB 240. The switches may be a dome switch, a piezoelectric switch, and the like.

Also, the back input part 230 includes a first button part 233 and a second button part 232. The first button part 233 is exposed to the outside form the back side of the terminal and is configured to receive a push input of a first function. The first function may be a function related to ON/OFF of power or activation of the display part. Thus, as described above with reference to FIGS. 2A and 2B, the first button part 233 may be a power key of the terminal.

The second button part 232 includes keys 232c and 232d disposed on both sides of the first button part 233 and is configured to receive a push input of a second function different from the first function. As described above, the second function may be a function related to adjustment of a volume of a sound output from the main body of the terminal or a scroll function regarding output information of the display part.

In addition, the second button part 232 is insertedly disposed in the open central portion of the support member 231, and a wing 232e may be formed to protrude along an outer circumferential surface of the second button portion 232.

The first button part 233 is formed to penetrate through the second button part 232 between the keys 232c and 232d. That is, a through hole 232f is formed in the second button part 232. As illustrated, the keys 232c and 232d are exposed to the outside.

In detail, in order to form a height difference between the keys 232c and 232d and the first button part 233, the keys 232c and 232d have a sloped portion 232b sloped toward the through hole 232f. The sloped portion 232b may be a surface adjacent to the first button part 233, and may be formed as a curved surface. The first button part 233 is formed such that it does not protrude outwardly, compared with an end portion of the sloped portion 232b. This is to prevent the first button part 233 from being pressed irrespective of a user intention. Also, a planar portion 232a is formed in the keys 232c and 232d in a portion adjacent to the support member 231 such that the planar portion 232a is integrally formed with the sloped portion 232b. The first button part 233 and the second button part 232 may be formed of different materials. Through this structure and material, the user may easily discriminate among the first button part 233 and the second button part 232 through the structure and the material.

In the above, the case in which the back input part 230 includes a plurality of buttons has been described, but the present disclosure is not limited thereto. For example, the back input part 230 may include a single button. Also, in the following descriptions, a case in which the back input part includes a plurality of buttons will be described, but a function defined by an input with respect to any one of the plurality of buttons may also be applied to the single button.

As illustrated, even though the first button part 233 protrudes from the back side of the main body, in a case in which the back side of the main body comes into contact with an external object, the first button part 233 is prevented from being pushed by virtue of the presence of the sloped portion 232b.

Also, the back input part 230 may be configured to illuminate the outside. In detail, the back input part 230 includes the switches 239, a light source 235, and a light guide 236.

Switches 239a and 239b may be provided in plurality and disposed in a row to correspond to the first and second button parts 233 and 232. The switches 239a and 239b are mounted on a plate 237, and the plate 237 is connected to the FPCB 240. Here, the switches 239 may include, for example, a dome switch, a piezoelectric switch, and the like.

The light source 235 is disposed to be adjacent to the switches 239a and 239b, and may be an LED. The light source 235 includes first and second light sources 235a and 235b disposed on both sides of the switch 239a. In FIG. 5, it can be seen that the light sources 235a and 235b are disposed on both sides of the switch 239a corresponding to the first button part 233.

The light guide 236 is formed to cover at least a portion of the switch 239a, and is connected to the light source 235 to emit light from the light source 235. For example, the first and second light sources 235a and 235b are connected to both ends of the light guide 236, and the light guide 236 is disposed in a direction interesting the line formed by the switches 239a and 239b and formed to cover the switch 239a corresponding to the second button part 232. In above, it is illustrated that the light sources 235a and 235b are formed on both sides of the light guide 236, but the present disclosure is not limited thereto and the light source may be provided only at one side of the light guide 236. However, in order to make light quality uniform, preferably, the light sources 235a and 235b are disposed on both sides of the light guide 236.

Figure 10A:
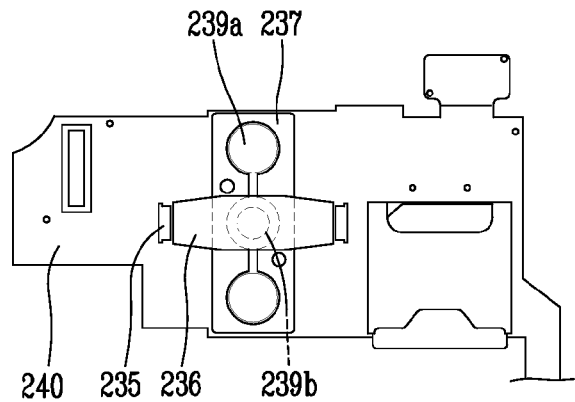
FIG. 10 is a view illustrating an example of using an optical guide related to an embodiment of the present disclosure.
Figure 10B:
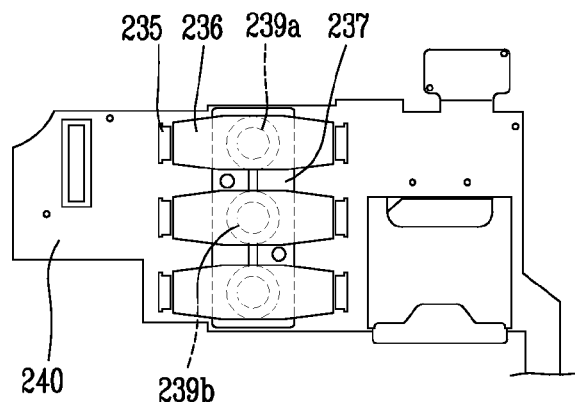
Figure 10C:
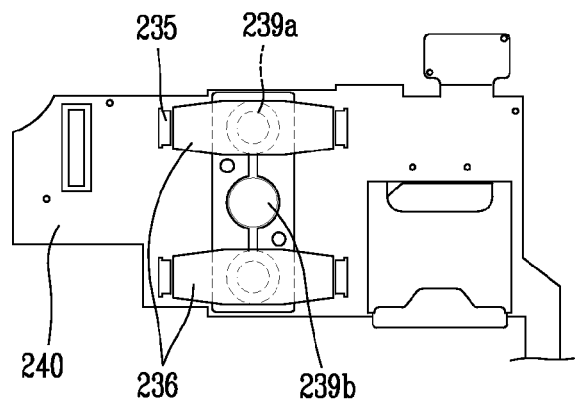

In this case, the second button part 232 may be formed of a light-transmissive material (or a translucent material) to allow light generated by the light source 235 to be outwardly transmitted therethrough. Meanwhile, as illustrated in (a) of FIG. 10, the first button part 233 may be formed of a light-transmissive material, and the light guide 236 may be formed on the first button part 233. As illustrated in (b) of FIG. 10, both the first and second button parts 233 and 232 may be formed of a light-transmissive material and the light guide 236 may be formed on the first and second button parts 233 and 232. Also, as illustrated in (c) of FIG. 10, in order to allow light generated by the second button part 232 to be transmitted to the outside, the second button part 232 may be formed of a light-transmissive material and the light guide 236 may be formed on the second button part 232.

The button part, in particular, the first button part 233, is formed of a light-transmissive material, and a colored layer may be formed through physical vapor deposition (PVD) in order to obtain a fine surface. Here, in order to perform PVD, a portion is required to fix an object (i.e., the first button part). To this end, in an embodiment of the present disclosure, a knob portion 225 is formed. This will be described with reference to FIG. 7.

Referring to FIG. 7, in order to perform PVD on an exposed portion 233a, the knob portion 225 is provided. PVD is performed in a state in which the knob portion 225 is fixed by an adhesive portion 225a attached to the exposed portion 233a (please refer to (b) of FIG. 7). When a colored layer 233c is formed as the PVD is completed on the exposed portion 233a, the knob portion 225 is unnecessary so it is removed. An upper surface of the exposed portion 233a may become stainless steel through the PVD. In order to easily remove the knob portion 225, the dotted line 225c is marked on a portion of the knob portion 225 and a dummy portion 225b is cut away. After the dummy portion 225b is removed, the body portion 233b is formed to be transparent or semi-transparent integrally with the exposed portion 233a with the adhesive portion 225a through insert injection molding (please refer to (c) of FIG. 7). Here, the body portion 233b may be formed of a resin. The first button part 233 may be manufactured through the aforementioned process, and thus, the first button part 233 may illuminate by using the light source 235.

Also, as illustrated in FIG. 5, a support member 234 is provided between the first button part 233 and the second button part 232. The support member 234 includes a protrusion 234a protruding toward the switch 239 and a demarcating portion 234b formed at the center and having a size corresponding to the first button 233.

The demarcating portion 235b demarcates portions corresponding to the first and second button parts 233 and 232 in order to allow the first and second button parts 233 and 232 to be pressed without affecting each other. The demarcating portion 235b may be formed to have a slit shape. The support member 234 may be formed of rubber, and the light guide 236 may have a through hole 236a to allow a protrusion 234b corresponding to the switch 239 to penetrate therethrough. According to this structure, a force applied to push the button part 233 may be effectively transmitted to the switch 239. Here, the switches 239 are formed in a row and include a switch 239b corresponding to the first button part 233 and switches 239a corresponding to the second button part 232. The switches 239a are formed on both sides of the switch 239b.

Also, the switches 239a and 239b are connected by an air path 238 formed on the plate 237. The air path 238 provides a path allowing air generated when the switch 239 is pressed to move. The light guide 236 is used to illuminate the outside, and in an embodiment of the present disclosure, the light guide 236 may cover at least a portion of the switch 239 to illuminate the outside.

As illustrated in FIG. 6, in an embodiment of the present invention, in order to shield an electronic component 275 (please refer to FIG. 14) mounted on a PCB 281 from electromagnetic interference (EMI), a shield can 260 is provided. Also, in order to tolerate pressure generated when the first and second button parts 233 and 232, a key plate 250 is provided. The key plate 250 is disposed between the shield can 260 and the second PCB 240, and supports the first button parts 232 and 233 when the first and second button parts 233 and 232 are pressed, and assist rigidity of the shield can 260. Here, the key plate 250 may be fixedly connected to the support member 224.

Figure 8:
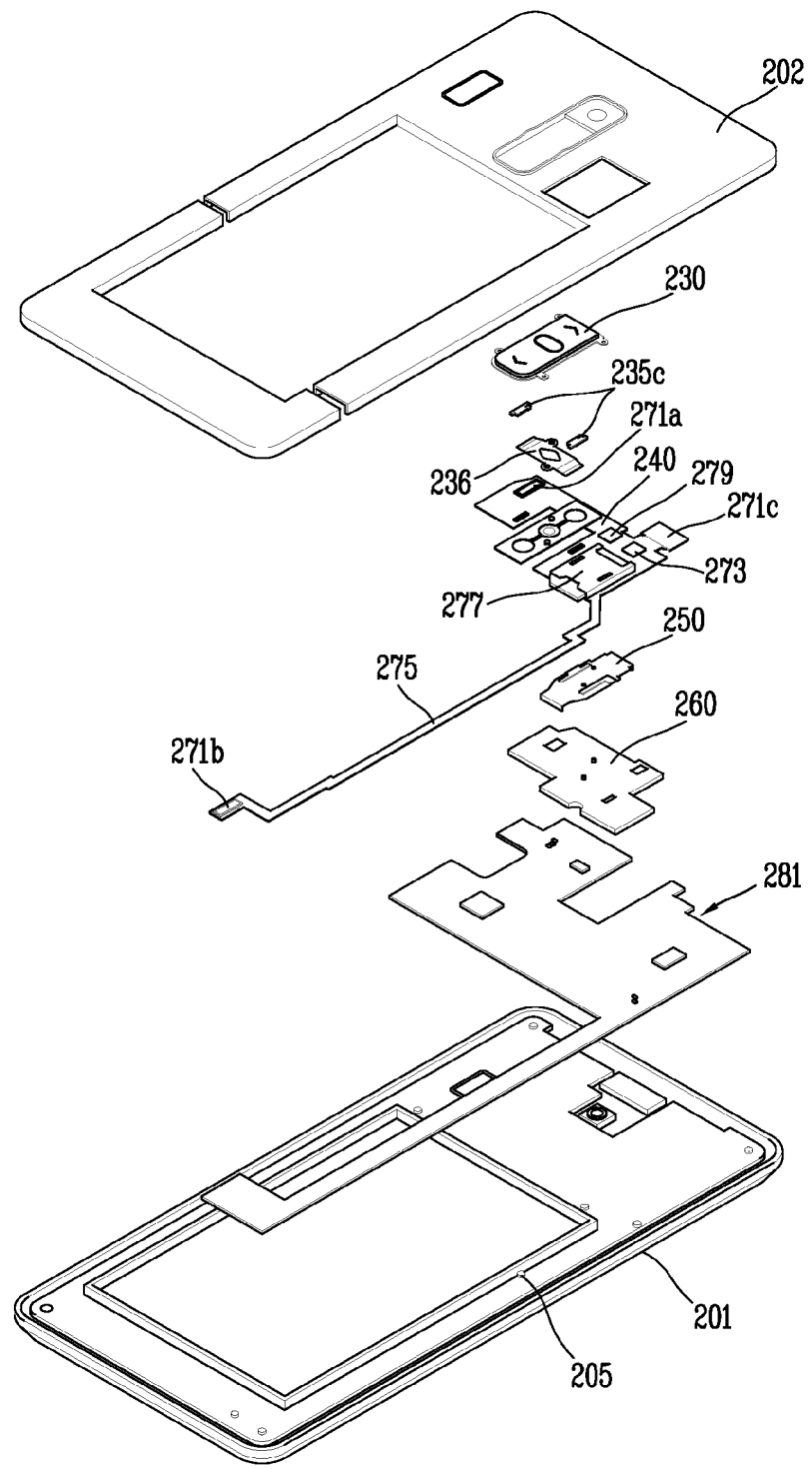
FIG. 8 is an exploded perspective view of a mobile terminal related to an embodiment of the present disclosure.
Figure 9:
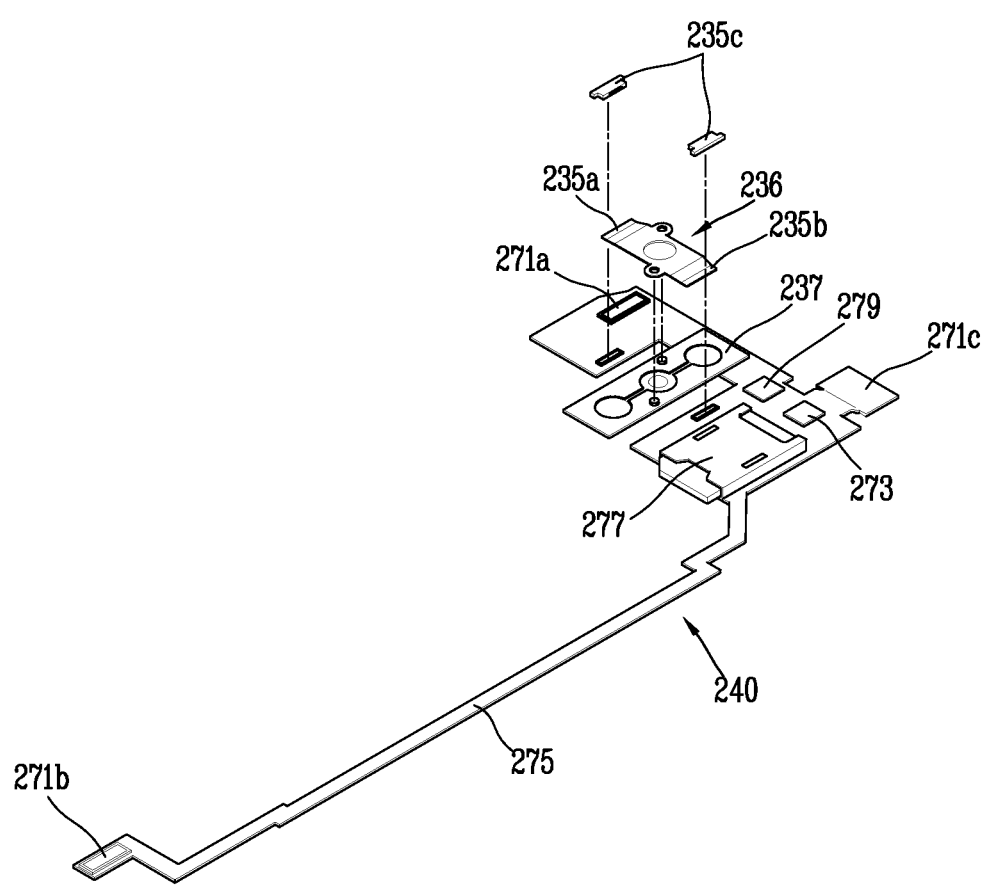
FIG. 9 is an exploded perspective view of a portion of a back input part attached to a second printed circuit board (PCB) related to an embodiment of the present disclosure.

FIG. 8 is an exploded perspective view of a mobile terminal related to an embodiment of the present disclosure, and FIG. 9 illustrates the light guide 236 and light blocking members 235c coupled to the second PCB 240. The light blocking members 235c may allow light to be emitted only through the light guide 236 and block spreading of light to other part. Also, a capacitor 273, a sim socket 277, a touch window driver IC chip 279, and the like, are mounted on the second PCB 240. The capacitor 273 serves to reduce malfunction with respect to a touch input and stabilize electrical performance, and the sim socket 277 includes a sim card as a memory card inserted to perform an interface function with an external device. The touch window driver CI chip 279 serves to drive a touch sheet.

Also, first and second connectors 271a and 271b are connected to the second PCB 240 to electrically connect a touch pattern, and the like. The second PCB 240 may be connected to the PCB 281 by a third connector 271c and may be electrically connected by first and second connectors 271a and 271b. The first and second connectors 271a and 271b are connected by a connection line 275. The second PCB 240 may be coupled to the front case 201, and in order to couple the PCB 281 and the front case 201, in an embodiment of the present disclose, a plurality of bosses 205 are formed on the front case 201. The PCB 281 may be coupled to the front case 201 by the bosses 205. Here, the second PCB 240 is disposed to cover the PCB 281.

Figure 11:
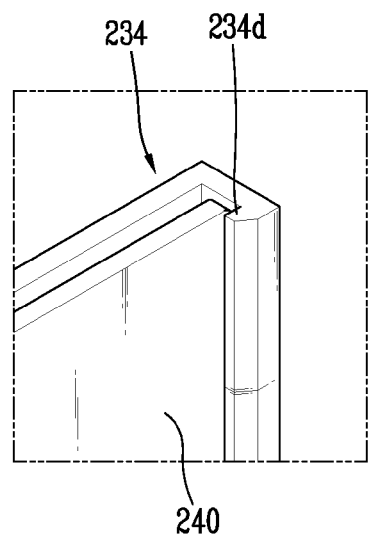
FIG. 11 is a perspective view illustrating coupling of a second printed circuit board (PCB) and a support member related to an embodiment of the present disclosure.
Figure 12:
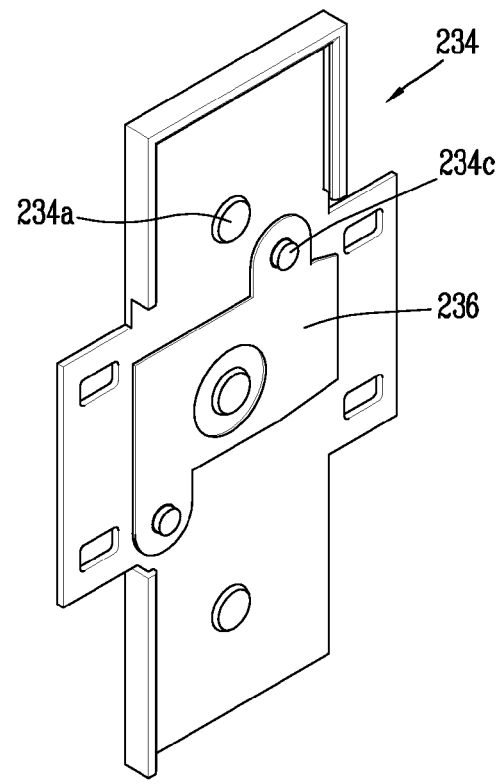
FIG. 12 is a conceptual view illustrating a configuration in which an optical guide is attached to a support member related to an embodiment of the present disclosure.

Also, according to an embodiment of the present disclosure, as illustrated in FIG. 11, the second PCB 240 may be coupled with the support member 234 by a hook 234d. The plate 237, the light guide 236, the light source 235, the light blocking member 235c, and the key 239 may be integrally formed on the second PCB 240, and as illustrated in FIG. 12, the light guide 236 may be easily coupled to the support member 234 by a pin guide 234c formed on a back side of the support member 234.

In an exemplary embodiment of the present disclosure, a method of connecting the first PCB 281 and the second PCB 240 may include a method of indirectly connecting the first PCB 281 and the second PCB 240 and a method of directly connecting the first PCB 281 and the second PCB 240. The direct connecting method refers to a method of connecting the first PCB 281 and the second PCB 240 by the shortest distance without a bypass component, and the method of indirectly connecting the first PCB 281 and the second PCB 240 refers to a method excluding the indirect connecting method, that is, a method of connecting the first and second PCBs 281 and 240 by a connector.

Figure 14:
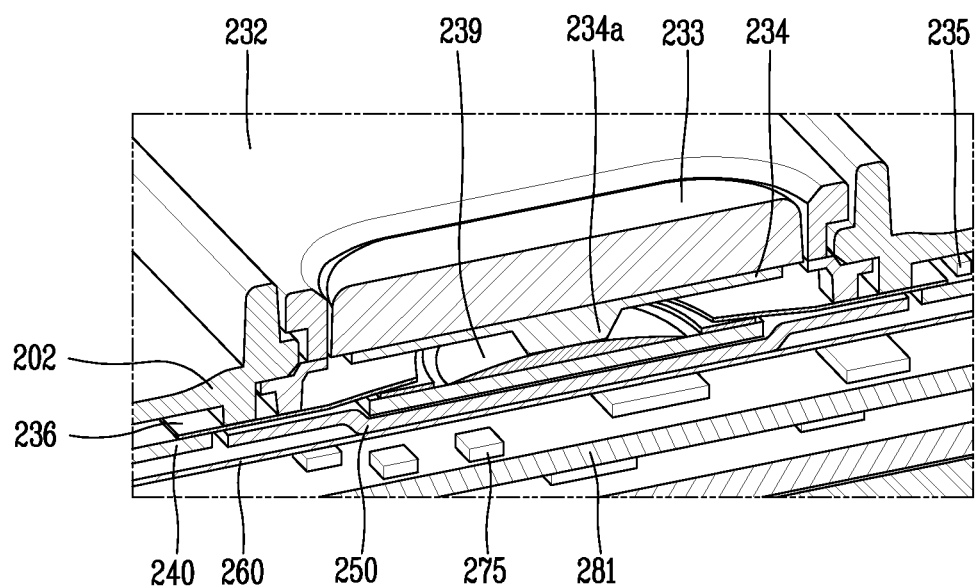
FIG. 14 is a cut perspective view of a back input part related to an embodiment of the present disclosure.

FIG. 14 is a cross-sectional view of the first button part 233 of the mobile terminal taken in a width direction according to an embodiment of the present disclosure, illustrating the method of indirectly connecting the first PCB 281 and the second PCB 240 by a connector formed extendedly outside. Referring to the direct connecting method, as illustrated in FIG. 8, the second PCB 240 may be formed extendedly and connected to the first PCB 281 by a connector formed at the second PCB 240.

Figure 13:
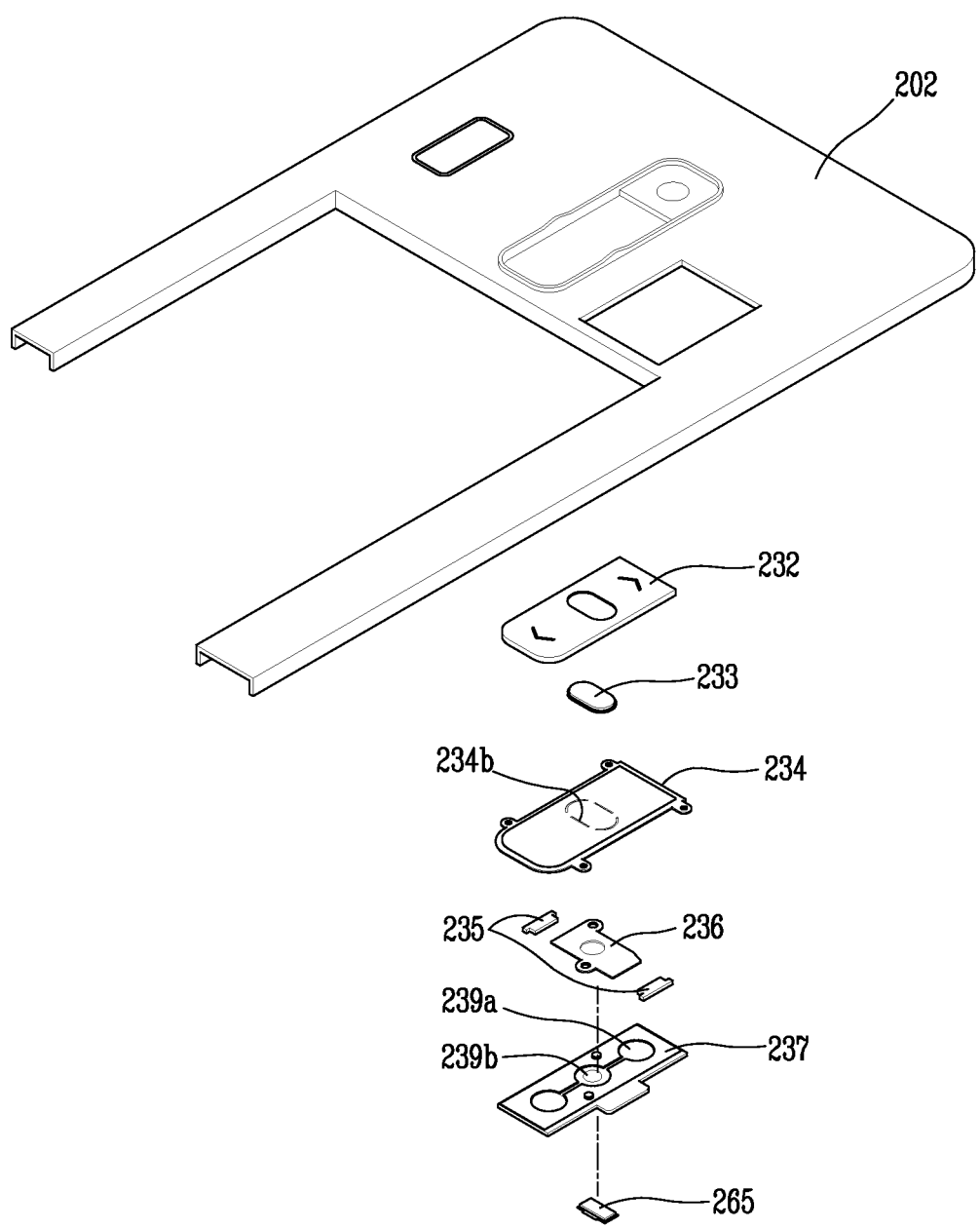
FIG. 13 is an exploded perspective view of a back input part coupled to a rear case related to an embodiment of the present disclosure.
Figure 15:
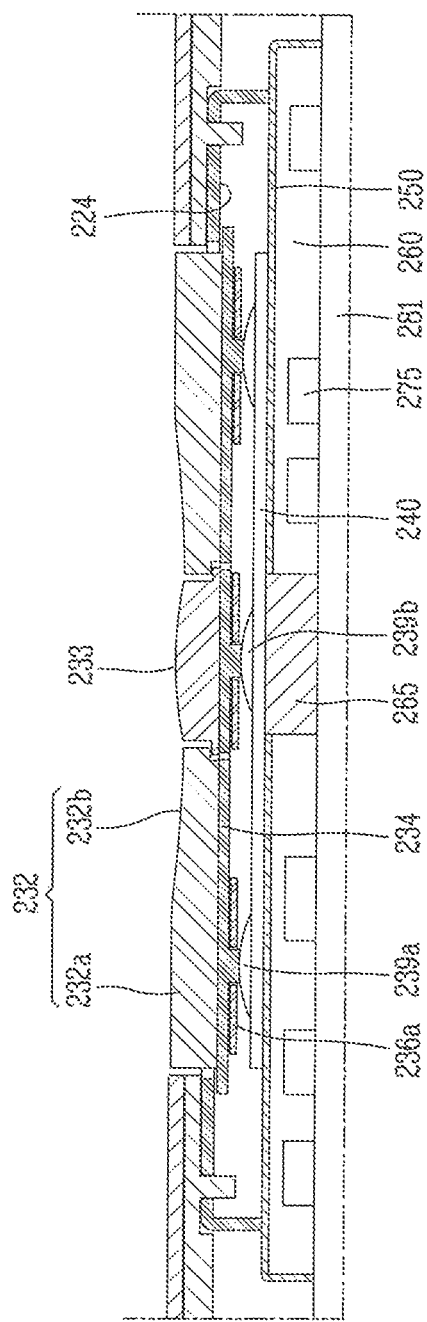
FIG. 15 is a cross-sectional view of a back input part related to an embodiment of the present disclosure.

FIG. 13 is a partial exploded perspective view of a mobile terminal according to an embodiment of the present disclosure, and FIG. 15 is a cross-sectional view of a mobile terminal according to an embodiment of the present disclosure. FIGS. 13 and 15 illustrated a direct connecting method. Referring to FIGS. 13 and 15, it can be seen that a connector 265 is installed between the first PCB 281 and the second PCB 240 to connect them. Here, the connector 265 is formed to penetrate through the shield can 260, and supports the first and second button parts 233 and 232 together with the shield can 260.

Meanwhile, in a case in which light sources are disposed on both sides as in the aforementioned embodiment, illumination may be outwardly provided through the light source, the light guide, the light blocking member, the support member, and the button part, but this has a slightly complicated path, which needs to be simplified.

Hereinafter, another embodiment of the present disclosure will be described.

Figure 16:
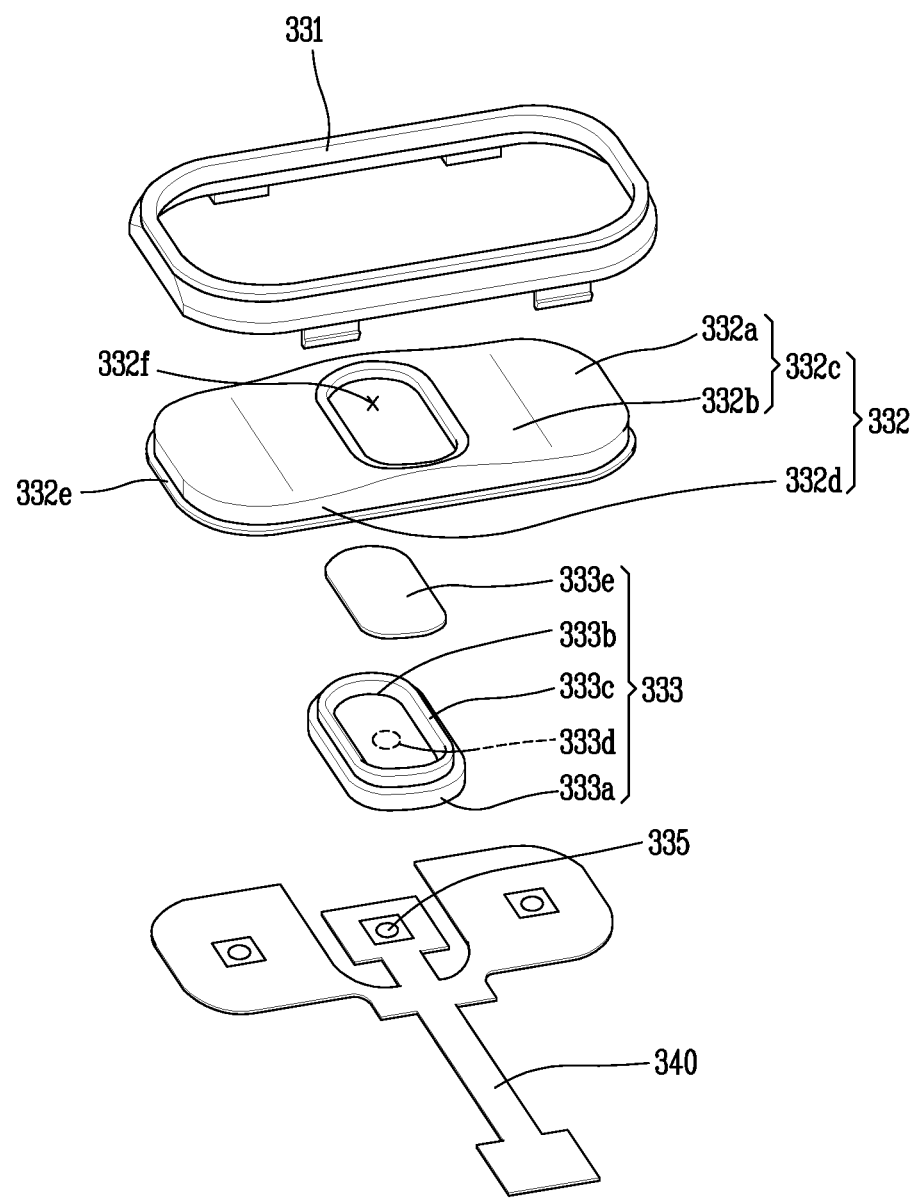
FIG. 16 is an exploded perspective view of a back input part related to another embodiment of the present disclosure.
Figure 17:
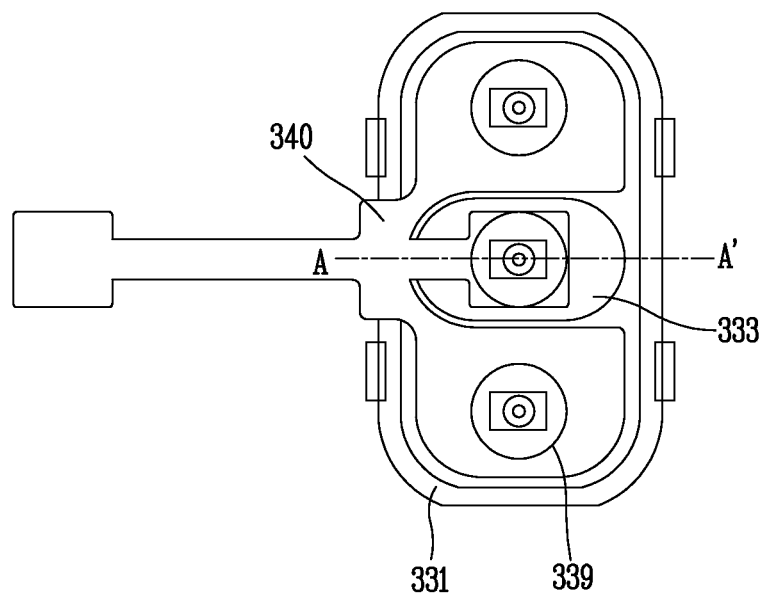
FIG. 17 is a rear view of the back input part of FIG. 16.
Figure 18:
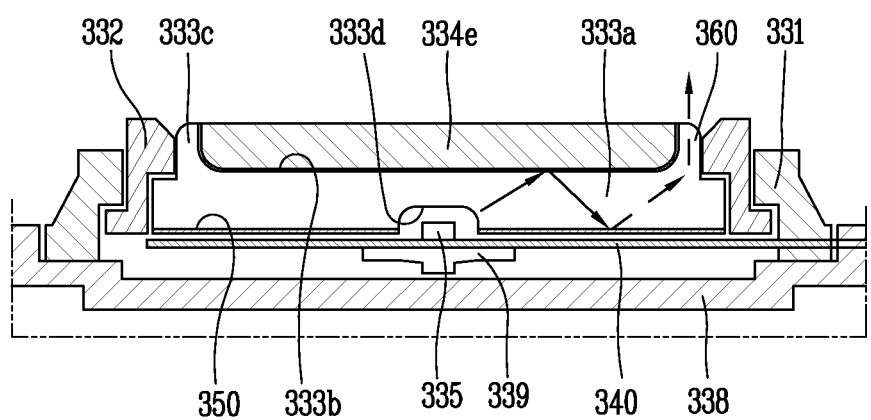
FIG. 18 is a cross-sectional view taken along line A-A' of FIG. 17.

FIG. 16 is an exploded perspective view of a back input part related to another embodiment of the present disclosure, FIG. 17 is a rear view of the back input part of FIG. 16, and FIG. 18 is a cross-sectional view taken along line A-A' of FIG. 17. Another embodiment of the present disclosure will be described with reference to FIGS. 16 through 18.

In FIG. 16, a back input part includes a support member 331 and first and second button parts 333 and 332 like those of FIG. 5, and shapes and functions thereof are similar to those of FIG. 5. However, in FIG. 16, the first and second button parts 333 and 332, a support member 331, a light source 335, and an FPCB 340 may be coupled. That is, compared with the configuration of FIG. 5 in which the light sources 235a and 235b are provided at both sides of the switch 239 and light is oriented to the first and second button parts 233 and 232 through the light guide 236, and here, the FPCB 240 and the first and second button parts 233 and 232 are separately configured, in the present embodiment, the light source 335 is installed in a region corresponding to the first and second button parts 333 and 332, and a switch 339 is attached to a back side of an FPCB 340. The switch 339 is pressed when the first or second button part 333 or 332 is pressed, and when pressed, lighting is provided by the light source 335.

As illustrated, in the first button part 333, an exposed portion 333e is mounted on an upper surface of a mounting portion 333b, a body portion 333a having a protrusion 333c is provided to surround the exposed portion 333*d*, and the second button part 332 is disposed at an outer side of the first button part 333, and thus, movement of the first button part 333 is limited. Also, a support member 338 is disposed to prevent the switch 339 from being excessively pressed, and when lighting is turned on by the switch 339, light 360 is transmitted to the outside through the protrusion 333*c*. Thus, the user may recognize that the button part is pressed. The first button part 333 may be mounted within the second button part 332 and supported together by the support member 338, and the body portion 333*a* may be formed of a transparent or semi-transparent material.

Meanwhile, in order to insert the light source 335, a recess portion 333*d* is formed outwardly in a lower portion of the center of the body portion 333*a* to prevent the light source 33 from being pressed even though the first button part 333 is pressed. The switch 339 may be a dome switch surface-mounted on one surface of the FPCB 340. A reflector 350 is provided on the FPCB 340 to cause light 360 emitted from the light source 335 to be reflected and oriented outwardly.

Also, the FPCB 340 may be electrically connected to the PCB 281 of FIG. 8, and the shield can 260 may be installed to prevent electromagnetic interference (EMI).

Figure 19:
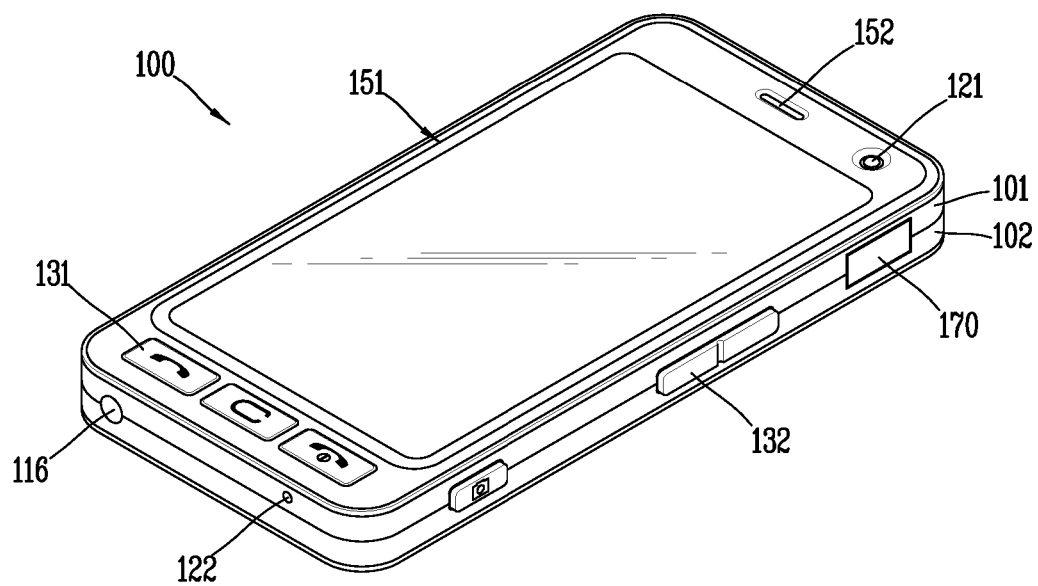
FIG. 19 is a front perspective view of a mobile terminal related to an embodiment of the present disclosure.

FIG. 19 is a front perspective view of the mobile terminal 100 related to an embodiment of the present disclosure.

The disclosed mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The terminal body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display part 151, an audio output unit 152, a camera 121, a user input unit 130 (131, 132), a microphone 122, and an interface unit 170 may be provided on the terminal body.

The display part 151 occupies a majority of the main surface of the front case 101. The audio output unit 151 and the camera 121 are disposed in a region adjacent to one end portion among both end portions of the display unit 151, and the user input unit 131 and the microphone 122 are disposed in a region adjacent to the other end portion. The user input unit 132 and the interface 170 may be disposed on side surfaces of the front case 101 and the rear case 102.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the audio output unit 152, or switching into a touch recognition mode of the display part 151.

Figure 20:
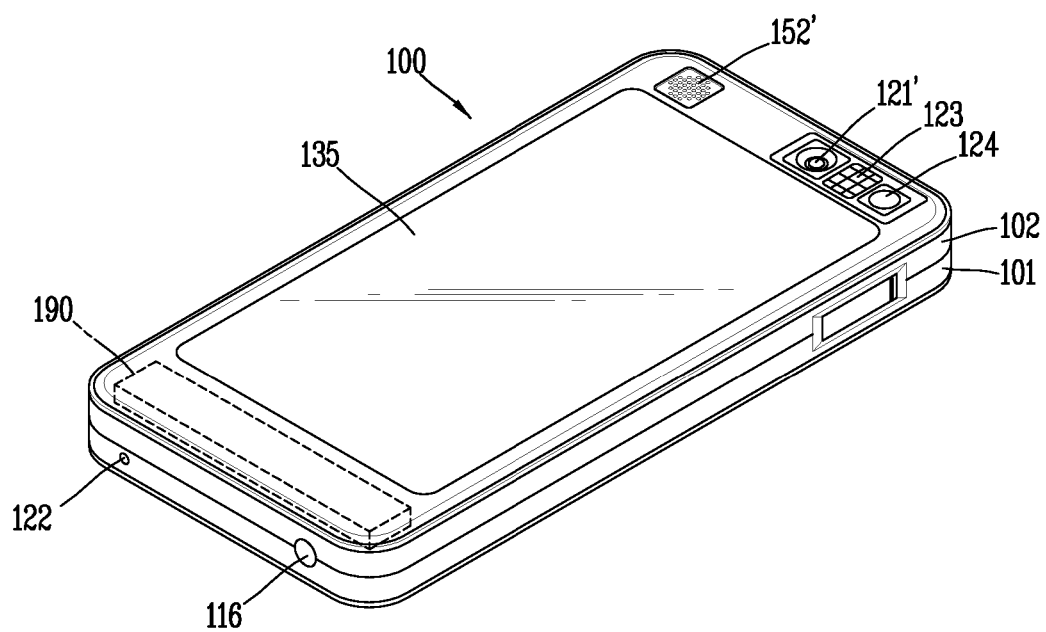
FIG. 20 is a rear perspective view of a mobile terminal related to an embodiment of the present disclosure.

FIG. 20 is a rear perspective view of the mobile terminal 100 illustrated in FIG. 19.

Referring to FIG. 20, a camera 121' may be additionally mounted at a back side of the terminal body, namely, on the rear case 102. The camera 121' has an image capturing direction, which is substantially opposite to the direction of the camera unit 121 (refer to FIG. 19), and may have a different number of pixels from that of the camera unit 121.

For example, it is preferable that the camera 121 has a relatively small number of pixels enough not to cause difficulty when the user captures his or her own face and sends it to the other party during a video call or the like, and the camera 121' has a relatively large number of pixels since the user often captures a general object that is not sent immediately. The cameras 121 and 121' may be provided in the terminal body in a rotatable and pop-up manner.

A flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

An audio output unit 152' may be additionally disposed at a back side of the terminal body. The audio output unit 152' together with the audio output unit 152 (refer to FIG. 19) can implement a stereo function, and may be also used to implement a speaker phone mode during a phone call.

An antenna 124 for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 for supplying power to the mobile terminal 100 may be mounted on the terminal body. The power supply unit 190 may be incorporated into the terminal body, or may include a battery 191 configured in a detachable manner on the outside of the terminal body.

Figure 21:
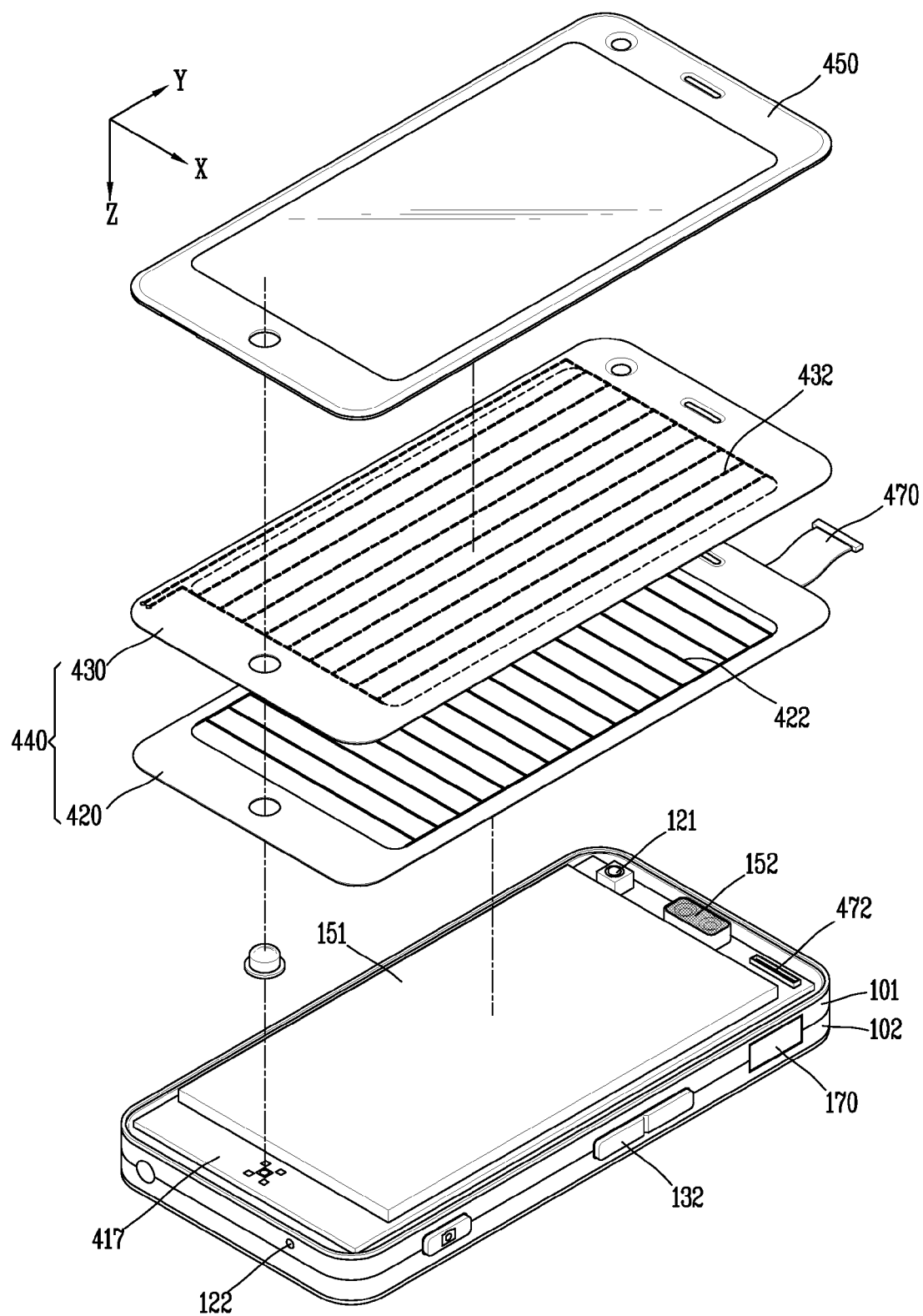
FIG. 21 is a partial exploded perspective view of a general mobile terminal.

FIG. 21 is a partial exploded perspective view of the mobile terminal 100 of FIG. 19, illustrating a configuration of the mobile terminal 100 having a touch sensing part 440.

Referring to FIG. 21, a PCB 417 is mounted on the rear case 102. A PCB 417 is mounted on the rear case 102. The PCB 417 may be configured as an example of the control unit 180 (please refer to FIG. 1) for operating various functions of the mobile terminal 100. As illustrated, the audio output module, the camera 121, and the like, may be mounted on the PCB 417.

A display part 151 electrically connected to the PCB 417 is disposed on one surface of the PCB 417. The display part 151 may have an area corresponding to a region in which light of a window (window 450) is transmitted. Accordingly, the user may recognize visual information output from the display part 151 from the outside.

Meanwhile, the window 450 is disposed on one surface of the touch sensing part 440 configured to sense a touch input.

In an embodiment of the present invention, the touch sensing part 440 may be disposed between the window 450 and the display part 150, or may be disposed within the display part 151. The touch sensing part 440 may be light-transmissive such that an image formed on the display part 151 may be transmitted therethrough. Regions of the touch sensing part 440 corresponding to a portion of the window 450 through which light is transmitted may form an input region. The touch sensing part 440 is configured to convert a change in an amount of electric charges generated in a specific portion thereof into an electrical input signal.

The window 450 coupled to one surface of the touch sensing part 440 may be formed of a material allowing a light to be transmitted therethrough, for example, a light-transmissive synthetic material, tempered glass, and the like. The window 450 may be formed to include a portion in which light cannot be transmitted therethrough.

A sound hole corresponding to the audio output module 152 and an image window corresponding to the camera 121 may be formed at one end portion of the touch sensing part 440 and the window 450. The image window may be separately formed of a material allowing light to be transmitted therethrough, or may be integrally formed with touch sensing part 440 and the window 450 so as to form a part.

The touch sensing part 440 may include first and second touch sheets 420 and 430 disposed in a layered manner. In an embodiment of the present disclosure, a touch pattern of the first touch sheet 420 is formed to extend in a first direction and configured to sense a touch input applied in the first direction. The second touch sheet 430 is disposed to cover the first touch sheet 420. A touch pattern of the second touch sheet 430 may be formed to extend in a second direction and may be configured to sense a touch input applied in the second direction.

For example, the first touch sheet 420 may sense a touch input applied in an X axis direction by a touch pattern 422 formed in a width direction (X axis direction) of the mobile terminal 100, and the second touch sheet 430 may be formed to sense a touch input applied in an Y axis direction by a touch pattern 432 formed in a length direction (Y axis direction) of the mobile terminal 100. The first and second touch sheets 420 and 430 may be light-transmissive conductive films such as an oxide indium tin (ITO) film, a carbon nano tube (CNT), and the like. In the above, it is illustrated that the touch sensing part 440 includes the first and second touch sheets 420 and 430, but the present disclosure is not limited thereto and the touch patterns may be formed on the same plane. This will be described hereinafter.

The touch sensing part 440 measures a change in electric charges in the second direction through the first and second touch sheets 420 and 430. The touch sensing part 440 is electrically connected to the PCB 417. The first and second touch sheets 420 and 430 are connected to a detection unit (not shown) and detect a touch input applied to an input region by using a detected change in an amount of electric charges.

For example, when a conductor such as a finger or a touch pen touches the window 450, electrons present in the window 450 move, and the touch sensing part 440 may detect a change in an amount of electric charges and measure coordinates.

The FPCB 470 is configured to electrically connect the first and second touch sheets 420 and 430 and the PCB 417, and may be electrically connected to a terminal portion 472.

The FPCB 470 may be formed in plurality. For example, the plurality of FPCBs 470 may be disposed at both ends of the mobile terminal 100 in a length direction (Y axis direction), respectively.

In the above, the mobile terminal 100 having the capacitive touch sensing part 440 has been described, but the mobile terminal 100 may be a mobile terminal having a different touch scheme, for example, a mobile terminal including a resistive touch sensing part.

In the case of the mobile terminal including a resistive touch sensing part, the window 450, the touch sensing part 440 including the first and second touch sheets 420 and 430, and a touch film (not shown) may be sequentially disposed on an upper surface of the display.

When a certain point of the touch film is pressed through a user's hand or a touch pen, a corresponding portion of the touch sensing part is pressed. As a result, the first and second touch sheets are brought into contact with each other in the pressed point, and the control unit 180 may sense the pressed point and generates a touch input corresponding to the pressed point.

Hereinafter, the mobile terminal 100 having the touch sensing part 440 having a new structure capable of reducing a width of a bezel will be described in detail.

Figure 22:
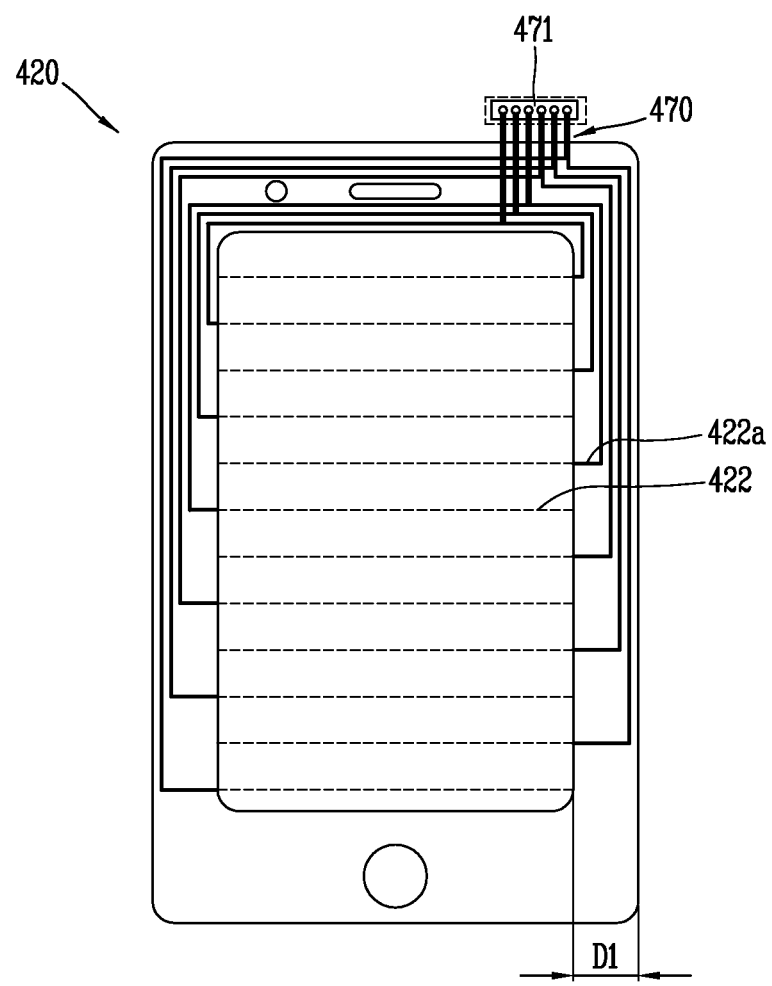
FIG. 22 is a plan view of a touch sensing part in which a touch pattern is formed according to the related art.

FIG. 22 is a plan view of the first touch sheet 420 of FIG. 21.

Specifically, FIG. 22 schematically illustrates a configuration in which a plurality of signal transmission parts 422a formed at both sides of the first touch sheet 420 gather on the FPCB 470 positioned at an upper side. That is, it can be seen that, since the FPCB 470 is positioned only at the upper side, all the signal transmission parts 422a gather only on one place, increasing a width D1 of the left and right bezels.

According to the structure, as the number of FPCBs 470 is increased, a space in which the signal transmission part 422a is disposed may be increased, and thus, the signal transmission part 422a may be more effectively disposed in the space.

Hereinafter, an embodiment of the present disclosure will be described in detail.

Figure 23:
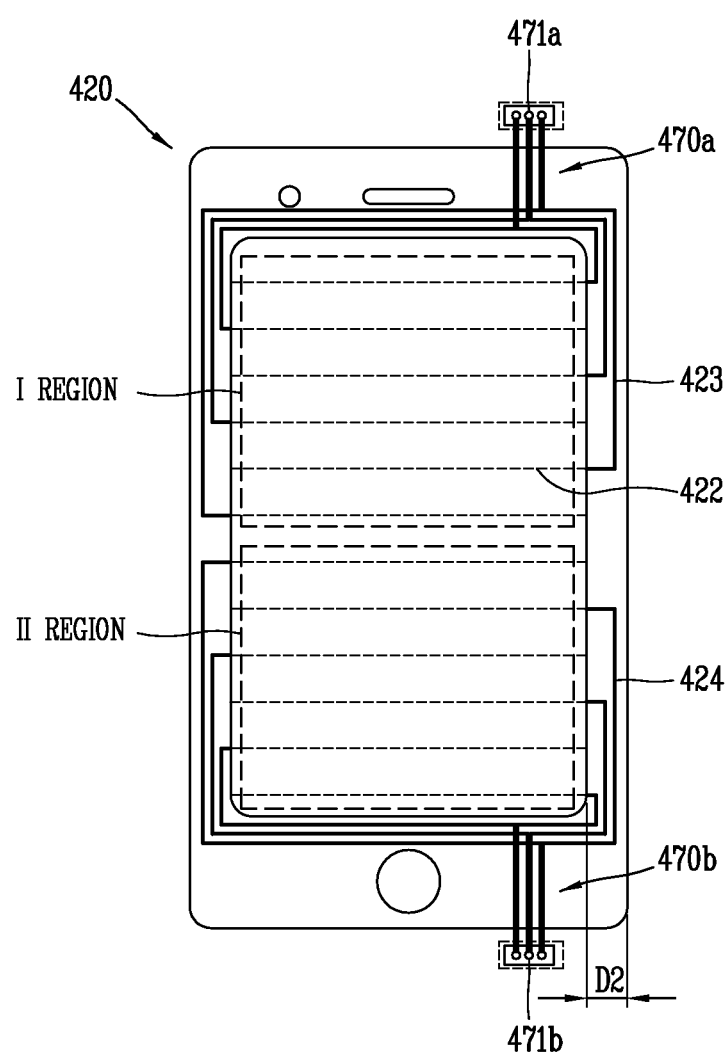
FIGS. 23 and 24 are plan views of a touch sensing part related to an embodiment of the present disclosure.

FIG. 23 is a plan view of the first touch sheet 420 according to an embodiment of the present disclosure. Referring to FIG. 233, FPCBs 470a and 470b are provide at upper and lower sides, and thus, a plurality of signal transmission parts 423 and 424 gather on upper and lower FPCBs 470a and 470b, whereby a width D2 of the bezel may be reduced. That is, as illustrated in FIG. 22, since all the signal transmission parts 422a gather only to the single FPCB 470, as the number of signal transmission parts 422a is increased, the width of the bezel is increased. However, according to an embodiment of the present disclosure, since the first and second signal transmission parts 423 and 424 are separately formed at both upper and lower sides, whereby a width of the bezel may be reduced to a half.

In an embodiment of the present disclosure, the bezel refers to an outer edge in which a screen is not displayed, when the mobile terminal is viewed at the front side.

As described above, the touch sensing part 440 may include the first and second touch sheets 420 and 430 each having a touch pattern. However, the present disclosure is not limited thereto and touch patterns may also be formed in two directions intersecting with each other on the single touch sheet 420.

Hereinafter, a configuration in which touch patterns are applied in two directions intersecting with each other in the touch sensing part 440, that is, on the single touch sheet 420 will be described.

Figure 25A:
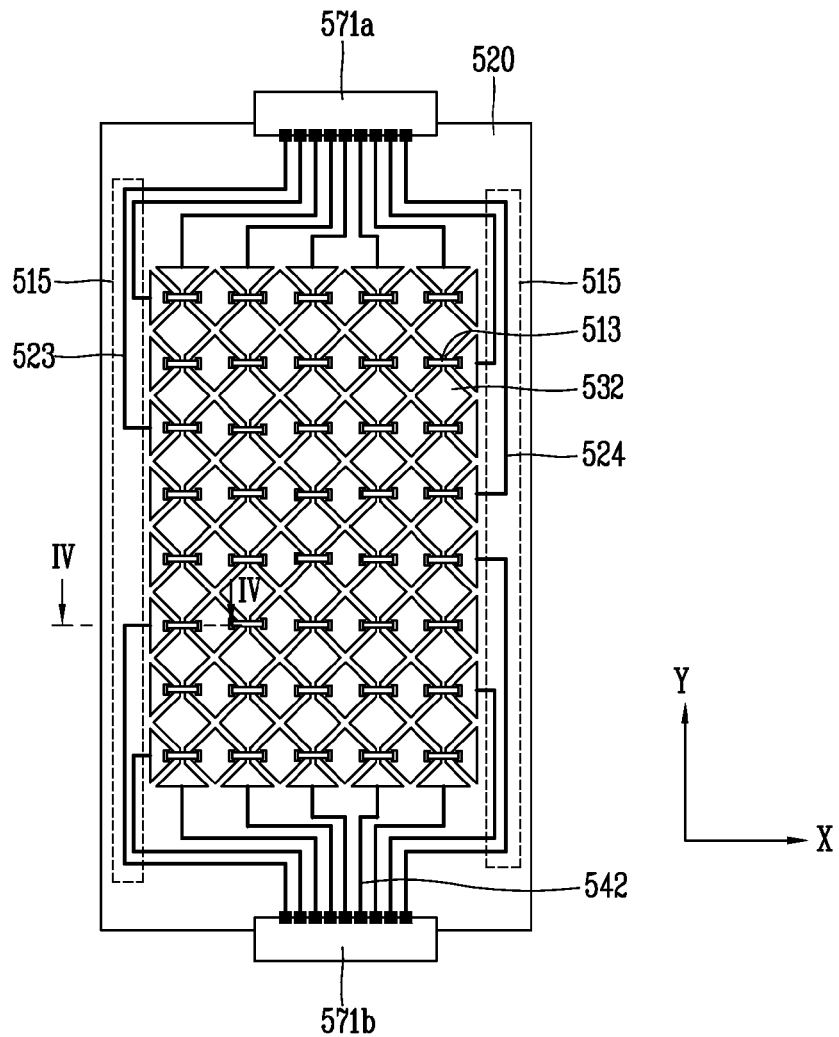
FIG. 25A is a conceptual view of touch patterns according to an embodiment of the present disclosure.

FIG. 25A is a plan view of touch patterns 422 and 432 in an embodiment of the present disclosure, in which first patterns 422 and second patterns 423 are formed on a single substrate.

That is, the touch patterns 422 and 432 are formed on the single substrate, and include a plurality of first patterns 422 arranged to be parallel in a first direction (for example, X axis direction) and a plurality of second patterns 432 arranged to be parallel in a second direction (for example, Y axis direction) intersecting the first direction or perpendicular to the first direction.

The first patterns 422 and the second patterns 432 are formed on the same plane so they intersect with each other, but the first patterns 422 and the second patterns 432 may be maintained in an electrically insulated state by an insulating layer 450. Also, the first patterns 422 may be connected to each other by a bridge 413.

Signal transmission parts 423 and 424 connected to the first patterns 422 are formed to be adjacent to both side ends of the touch sheet 420. As described above, since the first and second touch patterns 422 and 432 are formed on the same plane, the first touch sheet 420 described in an embodiment of the present disclosure may be the touch sensing part 440 by itself.

Figure 24:
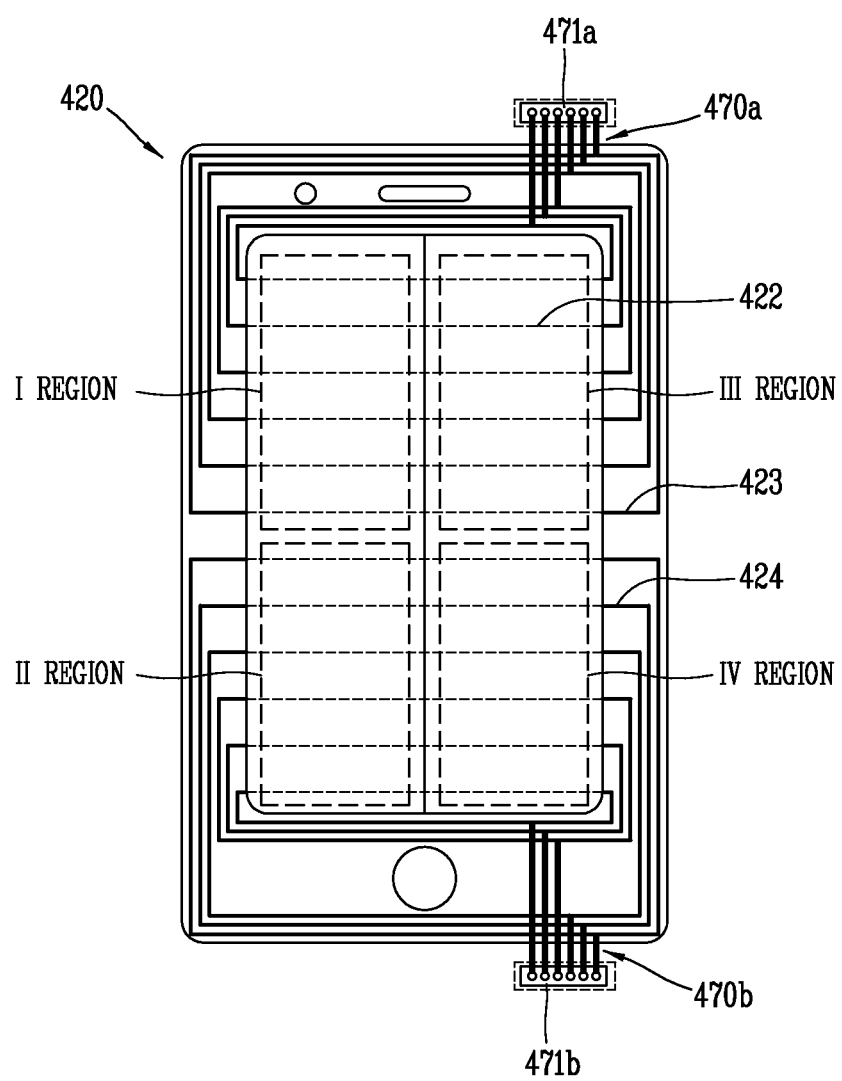

Also, FIG. 24 is a plan view of the touch sheet 420 according to an embodiment of the present disclosure. In FIG. 24, the touch sheet 420 is the same as the touch sheet 420 illustrated in FIG. 23, except that a touch area is divided in a width direction of the touch sheet 420.

As illustrated in FIGS. 23 and 24, in an embodiment of the present disclosure, a touch area may be formed to be divided into a plurality of regions (I, II, III, and IV regions), and this is to display image information using a different touch area in a case in which an error occurs in a partial touch area, so inputting is not normally performed.

Referring to FIGS. 23 and 24, the touch patterns 422, the first signal transmission part 423, and the second signal transmission part 424 are formed on the touch sheet 420. The touch patterns 422 may extend in the first direction, for example, in the width direction (X axis direction) of the mobile terminal, and are spaced apart from one another by a preset interval. The touch patterns 422 may be formed of a transparent conductive material, for example, indium tin oxide (ITO) through sputtering.

Referring to FIG. 21, the touch patterns 422 are disposed to extend in the first direction, for example, in the width direction (X axis direction) of the mobile terminal 100, and are spaced apart from one another by a preset interval. Referring to FIG. 21, the touch patterns 422 and 432 may be formed as a plurality of lines in directions perpendicular to each other. For example, the touch patterns 422 of the first touch sheet 420 may be implemented as a plurality of sensing channels, and the touch pattern 432 of the second touch sheet 430 may be implemented as a plurality of sensing channels extending in the length direction (Y axis direction of FIG. 21) of the mobile terminal 100 and may be implemented on one plane as described above.

The directions of the touch patterns 422 and 432 may be the opposite to those of the embodiment, and may have various shapes such as a curved shape or a figure shape, as well as the line shape. As illustrated in FIG. 25A, the touch patterns 522 and 532 have a diamond shape.

Hereinafter, a touch pattern extending in the width direction (X axis direction) of the mobile terminal 100 will be described.

FIG. 23 is a plan view of the touch sheet 420 according to an embodiment of the present disclosure. In the touch sheet 420, first signal transmission parts 423 are electrically connected to a portion of the touch pattern 422 to sense a touch input. As illustrated, the first signal transmission parts 423 are connected to a touch pattern of a region I and gather on the first FPCB 470a, and the second signal transmission parts 424 are connected to a touch pattern of a region II and gather on the second FPCB 470b formed at a position opposite to that of the first FPCB 470a. Here, the first and second signal transmission parts 423 and 424 pass through the edge areas of the touch sheet 440, that is, the touch sensing part.

Also, the touch pattern 422 may include the touch pattern connected to the first PFCB 470a and the touch pattern connected to the second FPCB 470b. The first and second signal transmission parts 423 and 424 are alternately connected to one side or the other side of the touch patterns of the regions I and II. The f first and second signal transmission parts 423 and 424 may be formed by printing or depositing a conductive material, and the conductive material may be silver, aluminum, or copper.

Here, the first and second FPCBs 470a and 470b are electrically connected to the first PCB 417. According to an embodiment of the present disclosure, the first and second FPCBs 470a and 470b may be connected to first and second connectors 471a and 471b, respectively.

Hereinafter, another embodiment of the present disclosure will be described.

Figure 25B:
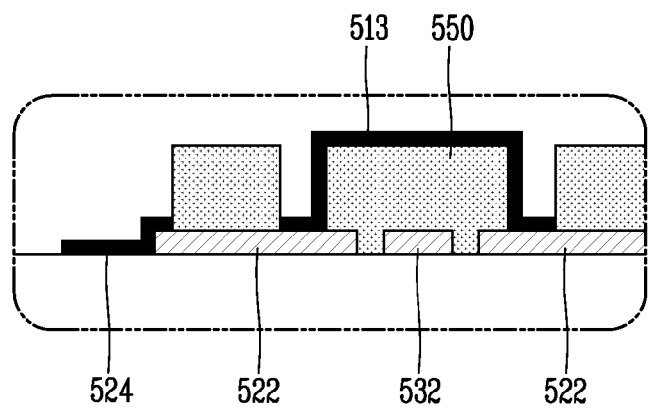
FIG. 25B is a cross-sectional view taken along line IV-IV of FIG. 25A.

FIG. 25A is a conceptual view of touch patterns according to an embodiment of the present disclosure, and FIG. 25B is a cross-sectional view of FIG. 25A. The touch sensing patterns may be formed on a substrate to form part of the display part and the mobile terminal.

In the case of the touch sheet according to an embodiment of the present disclosure, a scheme of sensing a touched portion is a capacitive scheme that an equipotential is formed in a conductive film, and a position in which a voltage of upper and lower plates is changed according to a touch is sensed to sense the touched portion.

The touch patterns include a plurality of first patterns 522 formed on a substrate 520 and arranged to be parallel in the first direction (for example, in the X axis direction) and a plurality of second patterns 532 are formed on the substrate 520 and arranged to be parallel in the second direction (for example, in the Y axis direction) intersecting with the first direction or perpendicular to the first direction. The first patterns 422 and the second patterns 532 are formed on the same plane and intersect with each other, and may be maintained in a mutually insulated state. The first patterns which are separated from each other may be connected by bridges 513.

The first and second signal transmission parts 523 and 524 connecting the first patterns 522 and the connectors 571a and 571b are formed on both side parts of the substrate 510, and a wiring portion 515 in which the first signal transmission parts 523 are formed may be bent when it is coupled with the display part 151.

The signal transmission parts 542 connecting the second patterns 532 and the first and second connectors 571a and 571b may be formed in the upper end or lower end of the substrate 520.

Figure 26:
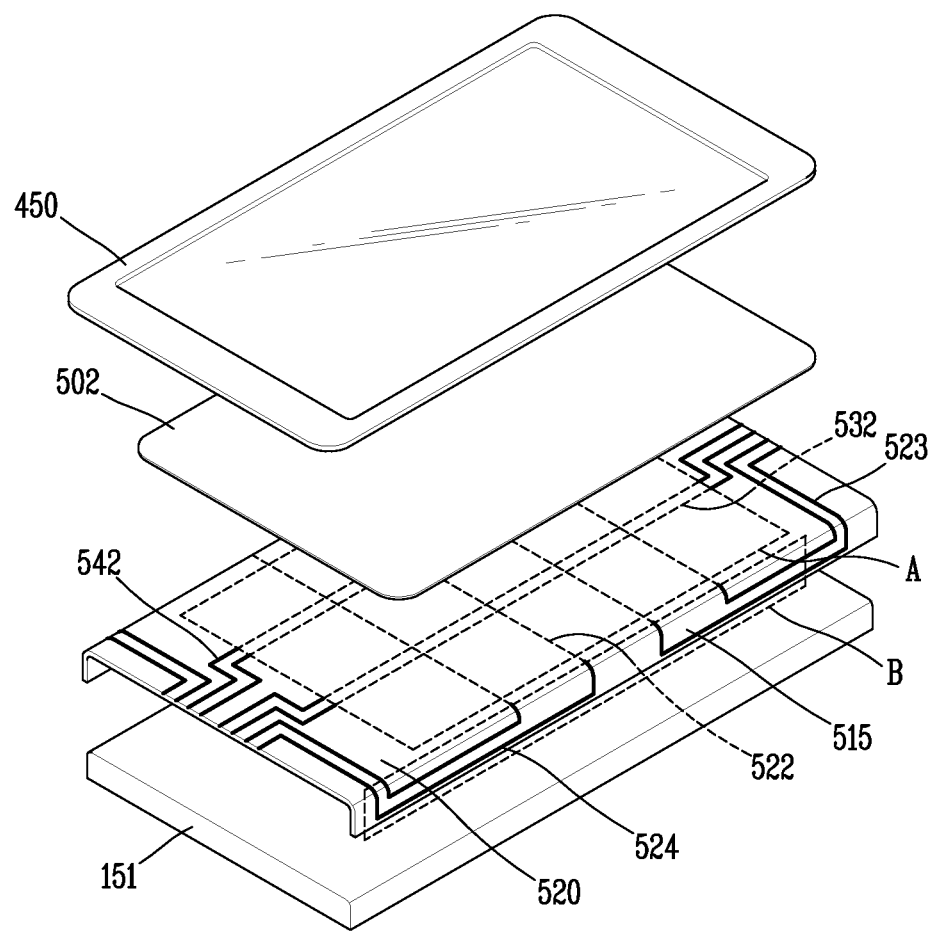
FIG. 26 is an exploded perspective view of a display module according to an embodiment of the present disclosure.
Figure 27A:
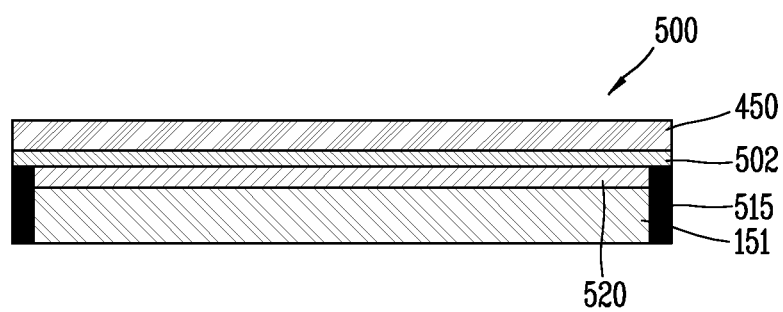
FIGS. 27A and 27B are cross-sectional views illustrating a state in which a window and a touch sensing part are coupled according to a modified example of a touch panel illustrated in FIG. 25A.
Figure 27B:
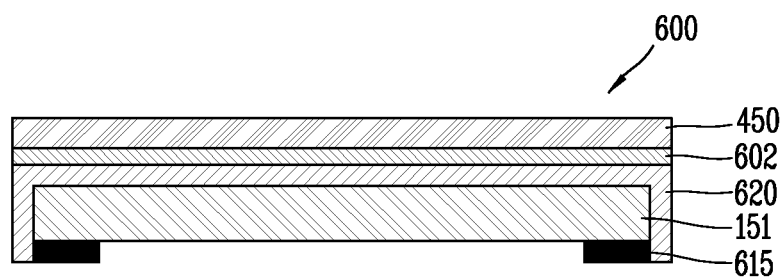

FIG. 26 is an exploded perspective view of a display module according to an embodiment of the present disclosure, and FIGS. 27A and 27B are cross-sectional views of a display module according to an embodiment of the present disclosure. As illustrated, display modules 500 and 600 include touch sheets 52 and 620 below a window 550, and adhesive layers 502 and 602 are formed between the window 550 and the touch sheets 520 and 620 to couple the window 550 and the touch sheets 520 and 620.

First and second patterns are formed on the touch sheets 520 and 620, and wiring parts 515 and 615 in which signal transmission parts connected to the first and second patterns are formed may be formed on a side surface of the display part 151 (please refer to FIG. 27A) or may be formed on a back side of the display part 151 (please refer to FIG. 27B). By forming the wiring unit 515 and 617 on the side surface or the back side, rather than on an upper surface of the display part 151, a bezel region may be further increased. That is, the wiring part 515 may be formed in an inactive region B of the touch sheet 520 covering both side surfaces of the display part 151. Signal transmission parts 523 and 524 may be formed in the wiring part 515, and since the signal transmission parts 523 and 524 are formed on the side surface of the display part 151, a size of the bezel corresponding thereto may be reduced.

Figure 28:
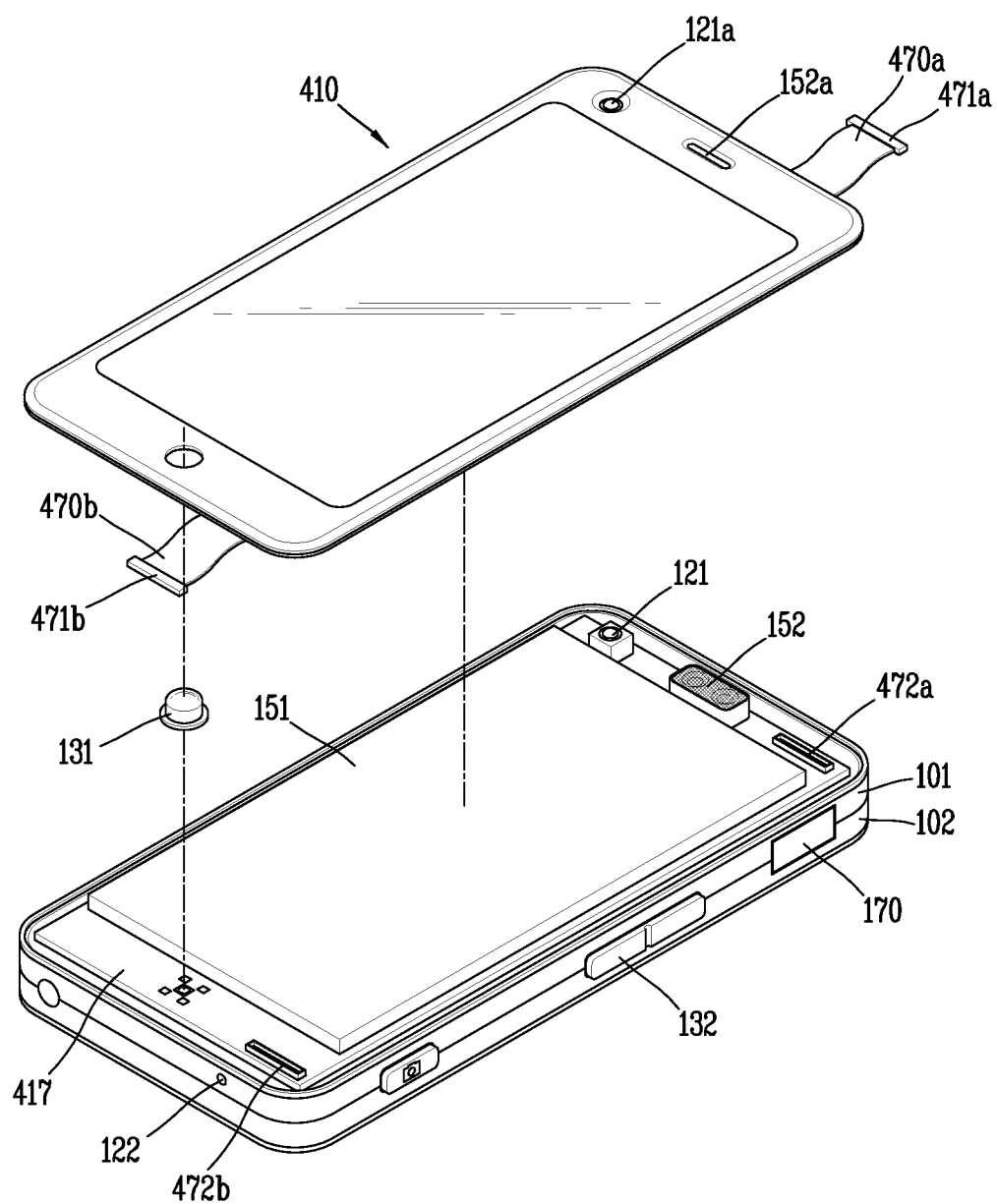
FIG. 28 is a partial exploded perspective view of a mobile terminal related to an embodiment of the present disclosure.
Figure 29:
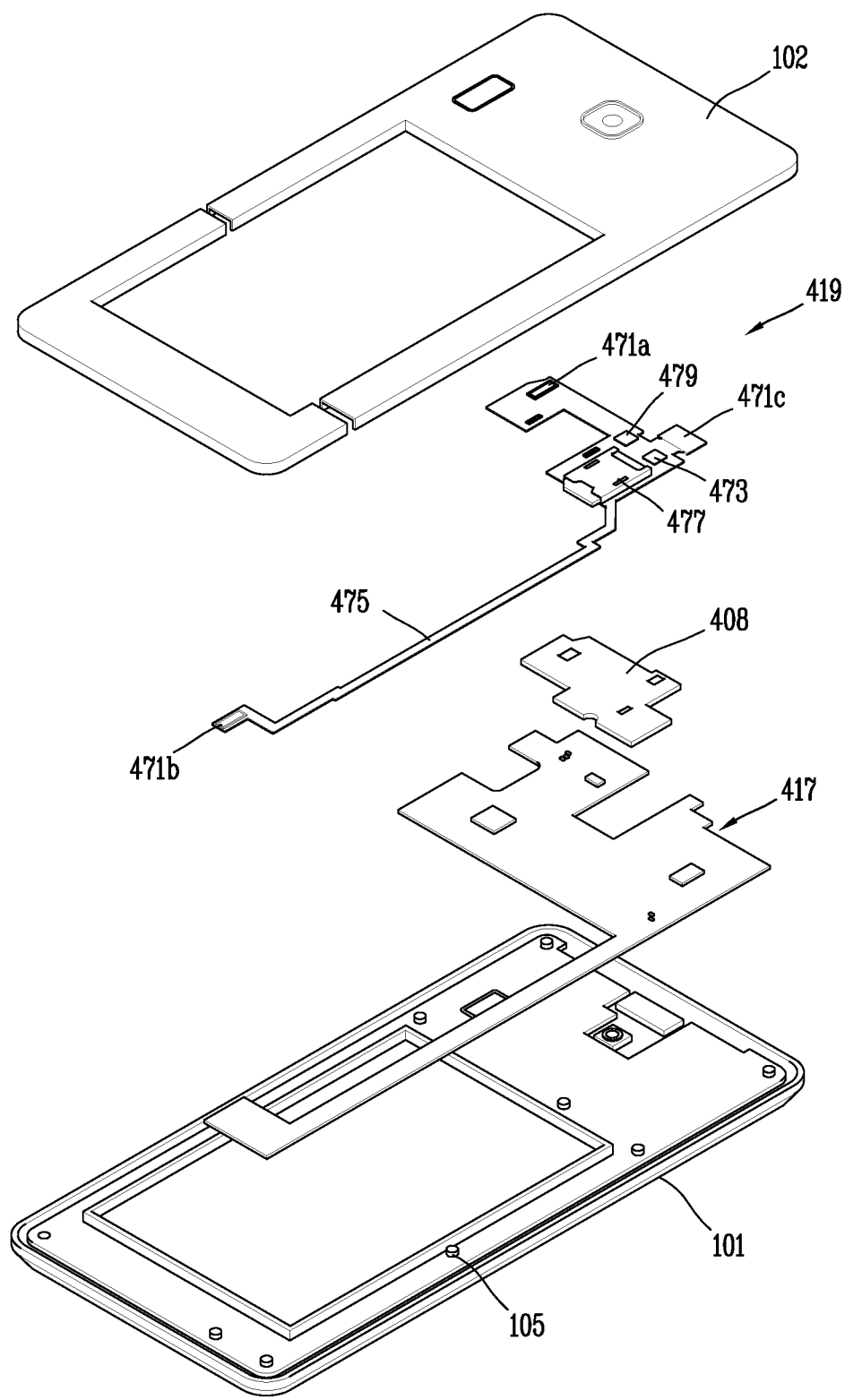
FIG. 29 is an exploded perspective view of a mobile terminal related to an embodiment of the present disclosure.

Meanwhile, FIGS. 28 and 29 are exploded perspective views of a mobile terminal related to an embodiment of the present disclosure. Referring to FIG. 28, a first terminal unit 472*a* and a second terminal portion 472*b* are formed such that first and second connectors 472*a* and 471*b* may be connected to the first PCB 417.

The first and second connectors 471*a* and 471*b* may be formed and electrically connected to a third FPCB 419, and the third FPCB 419 may have a shield can 408 for blocking electromagnetic interference (EMI). The shield can 408 may be disposed between the third FPCB 419 and the PCB 417.

The third FPCB 419 may be electrically connected to the PCB 417 by the third connector 471*c*, the first and second connectors 471*a* and 471*b* may be connected by a connection line 475, the third FPCB 419 may be coupled to the PCB 417, and the PCB 417 may be coupled to the front case 101. In order to couple the PCB 417 and the front case 101, in an embodiment of the present disclosure, a plurality of bosses 105 are formed on the front case 101. The PCB 417 and the front case 101 may be coupled by the bosses 105. The third FPCB 419 is disposed to cover the PCB 417.

Also, a capacitor 473, a sim socket 477, a touch window driver IC chip 479, and the like, are mounted on the third FPCB 419. The capacitor 473 serves to alleviate or prevent malfunction with respect to a touch input, and stabilize electrical performance, the sim socket 477 allows a sim card, a memory card, to be inserted therein to perform an interface function with an external device, and the touch window driver IC chip 479 serves to drive the touch sheets 420, 520, and 620.

The configuration and method of the mobile terminal according to the embodiments of the present disclosure described above are not limited in its application, but the entirety or a portion of the embodiments may be selectively combined to be configured into various modifications.

A number of exemplary embodiments have been described above. Nevertheless, it will be understood that various modifications may be made.

For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

The present invention may be applied to a mobile terminal having a back input part or a mobile terminal for reducing a width of a side bezel.

What is claimed is:
1. A mobile terminal comprising:
a terminal body in which a display part is formed on a front side thereof;
a back input part including a first button part exposed to a back side of the terminal body to receive a push input of a first function and a second button part disposed to be adjacent to the first button part and exposed to the back side of the terminal body to receive a push input of a second function,
wherein the first button part includes:
an exposed portion having a colored layer formed thereon and exposed to the outside;
a knob portion formed on a back side of the first button part to fix the exposed portion; and
a body portion covering the knob portion and integrally formed with the exposed portion, and
the second button part has a through hole accommodating the first button part,
wherein the back input part includes:
a support member disposed on back sides of the first and second button parts, and having protrusions formed on a back side thereof to correspond to the first and second button parts;
a plate disposed below the support member, having switches formed in a row and operated upon being pressed by the protrusions, and formed on the second PCB;
a light source disposed on one side of the switches or on both sides of the switches;
a light guide formed to cover at least a portion of the switches and connected to the light source to emit light from the light source; and
a light blocking member disposed no both ends of an upper surface of the light guide and causing light to be introduced only to the light guide.
2. The mobile terminal of claim 1, further comprising:
a first printed circuit board (PCB) disposed within the terminal body and allowing various electronic components to be mounted thereon;
a shield can covering the first PCB to shield the electronic components; and
a second PCB electrically connected to the first PCB and configured to have the back input part.
3. The mobile terminal of claim 1, wherein the exposed portion is formed of stainless steel, and the body unit is formed of a light-transmissive material.
4. The mobile terminal of claim 1, wherein the light guide has a through hole formed in a portion corresponding to the protrusion, is disposed in a direction intersecting with the row, and covers a portion or the entirety of the switches.
5. The mobile terminal of claim 1, wherein the switches are connected by an air path.
6. The mobile terminal of claim 1, wherein the support member includes a demarcating portion configured to demarcate a region corresponding to the first button part and a region corresponding to the second button part, is formed of rubber, and is coupled to the first and second button part by a hook formed at an edge thereof or is coupled to the first and second button parts by bonding.
7. The mobile terminal of claim 6, wherein the plate, the light source, the light guide, the light blocking member, and the second PCB are integrally formed by the hook of the support member.
8. The mobile terminal of claim 7, wherein a wing is formed on an edge of the second button part so as to be caught by a back side of the terminal body.
9. The mobile terminal of claim 1, wherein the first PCB and the second PCB are connected by a connector.

10. The mobile terminal of claim 1, wherein a key plate assisting rigidity of the shield can is disposed between the shield can and the second PCB.

11. The mobile terminal of claim 1, wherein the second button part includes a planar portion parallel to the back side of the terminal body and a sloped portion sloped downwardly toward the through hole from the planar portion, and the first button part is formed to be inwardly recessed, compared with the back side of the terminal body.

12. The mobile terminal of claim 1, wherein the first function is a function related to ON/OFF of power or activation of the display part, and the second function is a function related to scroll with respect to output information of the display part or a function related to adjustment of a volume of a sound output from the terminal body.

13. A mobile terminal comprising:
a terminal body in which a display part is formed on a front side thereof; and
a back input part including a first button part exposed to a back side of the terminal body to receive a push input of a first function,
wherein the back input part includes:
a support member allowing the first and second button parts to penetrate through an interior thereof so as to be exposed to the outside;
a flexible printed circuit board (FPCB) attached to a back side of the support member;
a light source installed in a region corresponding to the first and second button parts on the FPCB; and
a switch pressed when the first and second button parts are pressed, and disposed below the FPCB,
wherein the support member, the FPCB, the light source, and the switch are integrally formed.

14. The mobile terminal of claim 13, further comprising:
a support member positioned below the switch and supporting the switch when the switch is pressed.

15. The mobile terminal of claim 14, wherein the first button part has an exposed portion formed on an upper surface thereof and exposed to the outside, protruding along an outer edge thereof so as to be exposed, and limited in movement to the outside by the second button part.

* * * * *